US008077412B2

(12) United States Patent
Santo et al.

(10) Patent No.: US 8,077,412 B2
(45) Date of Patent: Dec. 13, 2011

(54) LENS BARREL AND IMAGING DEVICE

(75) Inventors: Takeo Santo, Osaka (JP); Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 1 day.

(21) Appl. No.: 12/699,050

(22) Filed: Feb. 3, 2010

(65) Prior Publication Data
US 2010/0220402 A1    Sep. 2, 2010

(30) Foreign Application Priority Data
Feb. 27, 2009   (JP) ................. 2009-046024

(51) Int. Cl.
G02B 7/02      (2006.01)
G02B 15/14     (2006.01)

(52) U.S. Cl. .................. 359/824; 359/823; 359/696

(58) Field of Classification Search .......... 359/822–828, 359/696
See application file for complete search history.

(56) References Cited

U.S. PATENT DOCUMENTS

| 5,499,143 A | 3/1996 | Sakamoto et al. |
| 5,708,535 A | 1/1998 | Orimo et al. |
| 5,939,804 A | 8/1999 | Nakao et al. |
| 5,956,187 A * | 9/1999 | Shintani ................ 359/696 |
| 6,381,076 B1 * | 4/2002 | Kashiwaba ............. 359/701 |
| 7,190,533 B2 * | 3/2007 | Nakamura ............. 359/811 |
| 7,292,396 B2 * | 11/2007 | Ito et al. ................ 359/703 |
| 2007/0273364 A1 | 11/2007 | Takei et al. |
| 2009/0040369 A1 * | 2/2009 | Miyoshi ................ 348/374 |

FOREIGN PATENT DOCUMENTS

| JP | 05-264878 | 10/1993 |
| JP | 07-239437 | 9/1995 |
| JP | 08-248290 | 9/1996 |
| JP | 2002-214504 | 7/2002 |
| JP | 2006-065128 | 3/2006 |
| JP | 3750251 | 3/2006 |

* cited by examiner

Primary Examiner — Ricky Mack
Assistant Examiner — Tuyen Tra
(74) Attorney, Agent, or Firm — Shinjyu Global IP

(57) ABSTRACT

An interchangeable lens unit comprises a second lens group support unit, a focus lens, a focus lens support frame, and a focus drive unit. The second lens group support unit supports the focus lens support frame movably in the Z-axis direction and has second cam pins disposed spaced apart around an optical axis. The focus drive unit is a unit for driving the focus lens support frame in the Z-axis direction with respect to the second lens group support unit and is disposed at a different position from those of the second cam followers when viewed in the Z-axis direction.

17 Claims, 20 Drawing Sheets

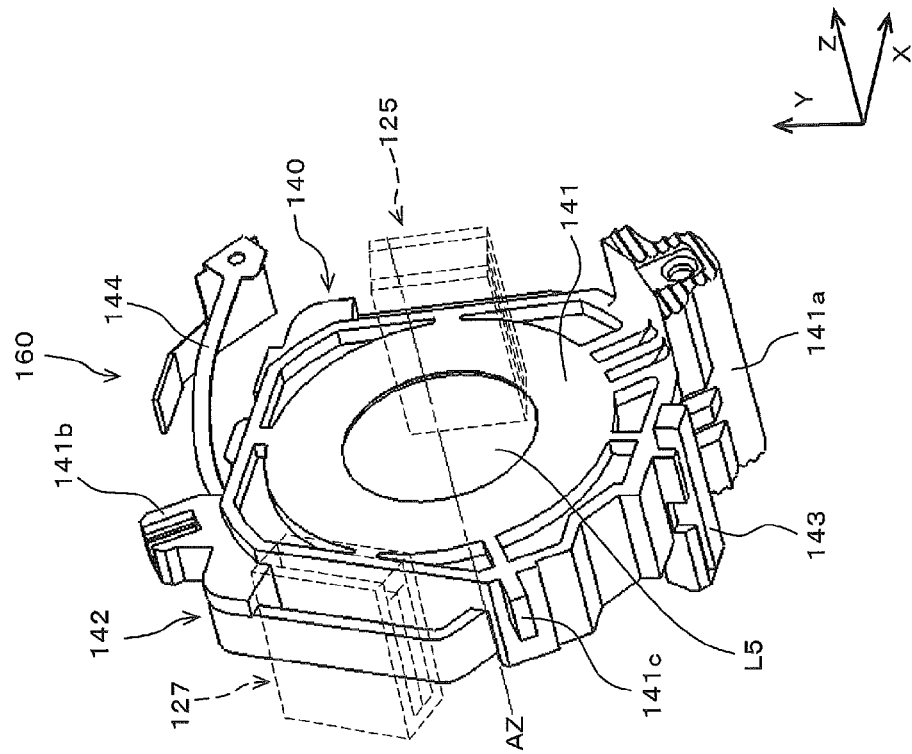
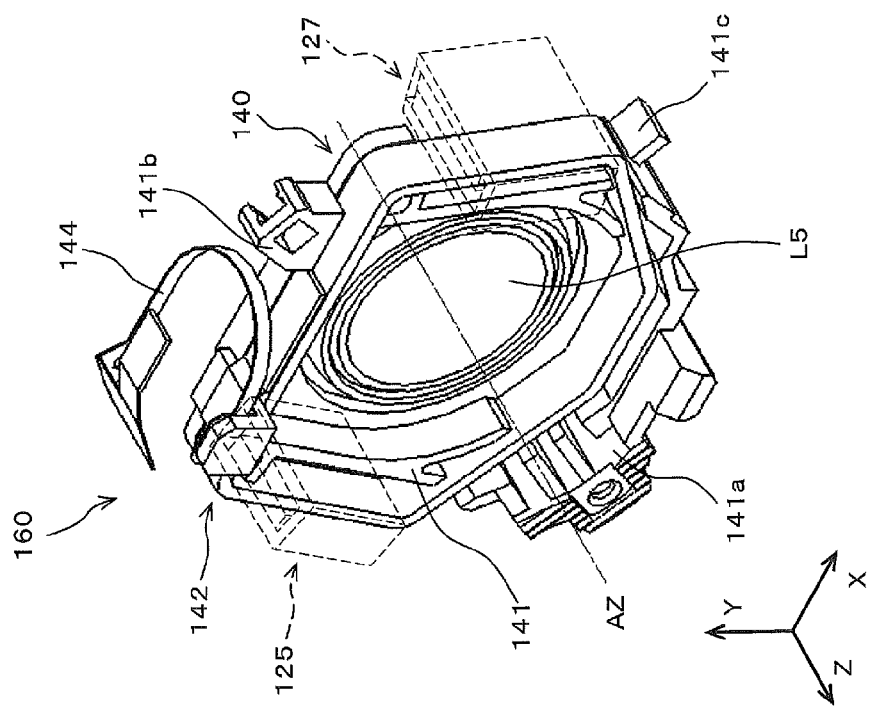
FIG. 11A
FIG. 11B ary Information

Generally, a digital camera is provided with a lens barrel whose focal distance can be varied. This type of lens barrel has an optical system that includes a plurality of lenses and a plurality of support frames that support the plurality of lenses and other components in the optical system. These support frames used in the lens barrel are movably supported by guide poles in the direction of the optical axis. When the support frames are driven in the direction of the optical axis, the relative position of the lenses in the optical system change, thereby allowing the focal distance to be varied.

The optical system also includes a focus lens for adjusting the subject distance. The distance at which the subject is in focus can be adjusted by driving the focus lens in the optical axis direction with a focus drive unit.

However, if a focus drive unit is installed in the support frame, the positional relationship between components of the focus drive unit and other peripheral members may end up requiring the size of the lens barrel to be larger in the optical axis direction and/or the radial direction.

In view of the above, it will be apparent to those skilled in the art from this disclosure that there exists a need for an improved lens barrel. This invention addresses this need in the art as well as other needs, which will become apparent to those skilled in the art from this disclosure.

LENS BARREL AND IMAGING DEVICE

CROSS-REFERENCE TO RELATED APPLICATIONS

This application claims priority under 35 U.S.C. §119 to Japanese Patent Application No. 2009-046024 filed on Feb. 27, 2009. The entire disclosure of Japanese Patent Application No. 2009-046024 is hereby incorporated herein by reference.

BACKGROUND

1. Technical Field

The technical field relates to a lens barrel for an imaging device.

2. Background Information

SUMMARY

Accordingly, aspects of the present invention have been created to solve the above-mentioned problems occurring in the conventional practice, and to minimize the increase in size of a lens barrel employing a drive unit.

In accordance with one aspect of the present invention, a lens barrel includes a first lens element with an optical axis, a first support frame configured to support the first lens element, and a second support frame including a plurality of cam followers. The first support frame is movably supported by the second support frame in a first direction parallel to the optical axis. The lens barrel also includes a drive unit configured to move the first support frame in the first direction. The cam followers are separately disposed around and substantially perpendicular to the optical axis of the first lens element and the outer peripheral side of the drive unit when viewed in the first direction.

These and other features, aspects and advantages of the present invention will become apparent to those skilled in the art from the following detailed description, which, taken in conjunction with the annexed drawings, discloses a preferred embodiment as well as other example embodiments of the present invention.

BRIEF DESCRIPTION

Referring now to the attached drawings which form a part of this original disclosure:

FIG. 11A is an oblique view of the front of the focus lens support frame;

FIG. 11B is an oblique view of the rear of the focus lens support frame;

DETAILED DESCRIPTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Summary of Digital Camera

Figure 1:
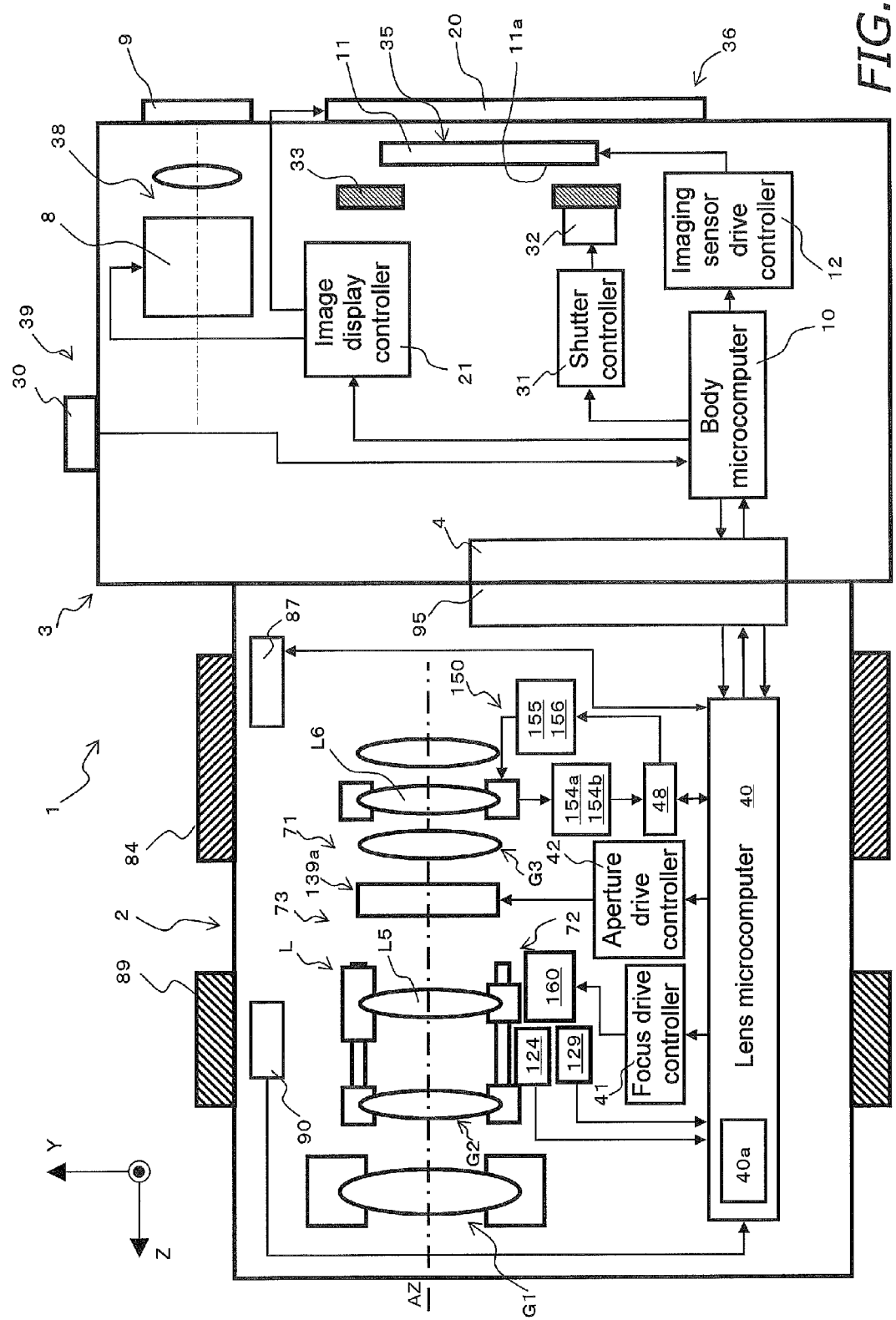
FIG. 1 is a simplified diagram of a digital camera.
Figure 2:
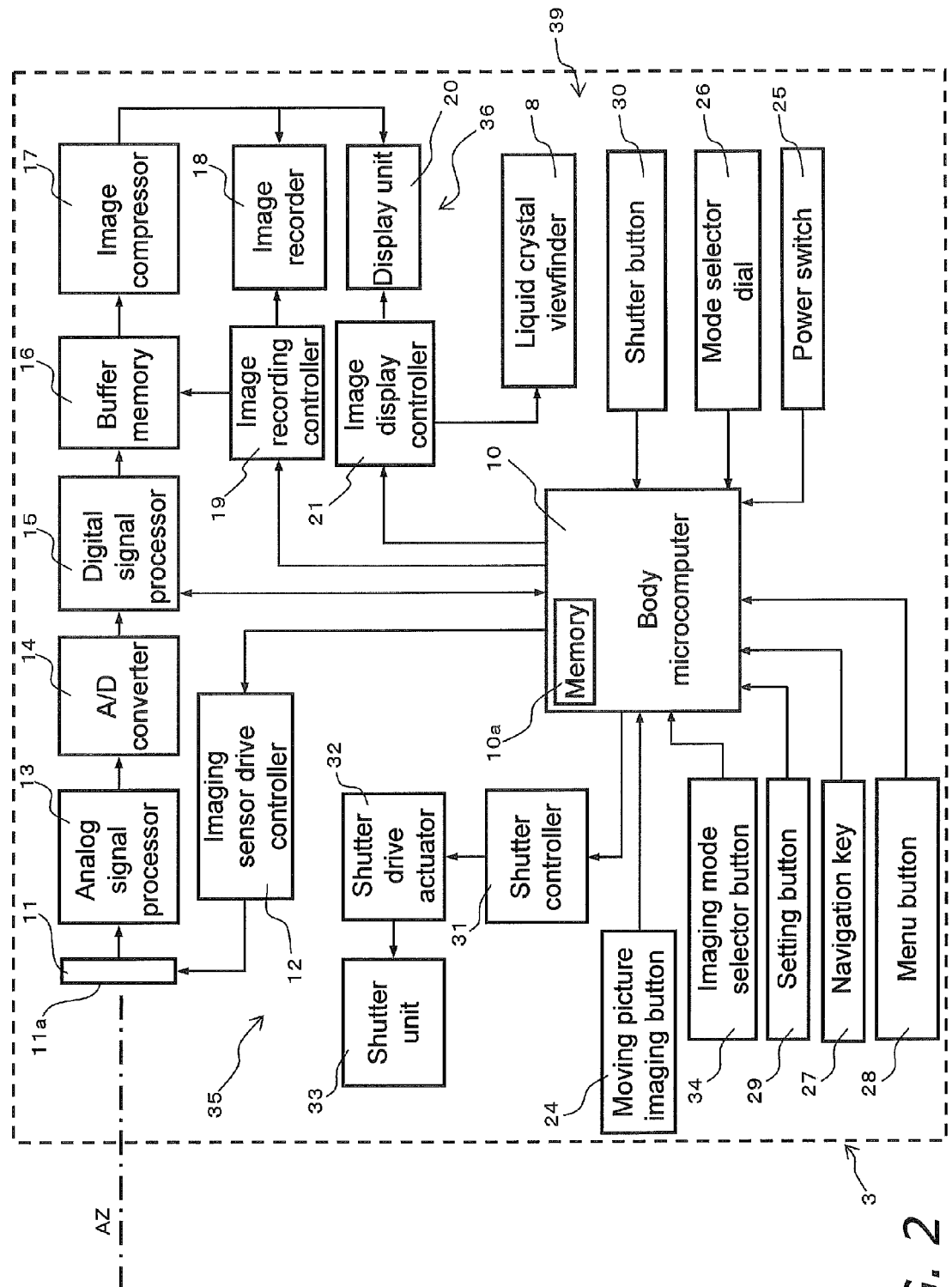
FIG. 2 is a block diagram of the configuration of a camera body.

Referring initially to FIG. 1, a digital camera 1 with an interchangeable lens is illustrated in accordance with at least one embodiment of the present invention. The digital camera 1 is an example of an imaging device capable of capturing only still pictures, only moving pictures, or both still and moving pictures. It will be appreciated by those skilled in the art after reviewing the drawings and the disclosure contained herein that imaging devices including but not limited to digital still cameras, digital video cameras, interchangeable lens digital cameras, portable telephones with a camera function, PDA's (personal digital assistants) with a camera function and the like may be used in accordance with the present invention.

The digital camera 1 typically includes a camera body 3 and an interchangeable lens unit 2 (an example of the lens barrel) that is removably mounted to the camera body 3. However, it should be understood from the drawings and the disclosure herein that a lens barrel integrated with the camera body 3 may also be employed in accordance with the present invention. The interchangeable lens unit 2 is mounted via a lens mount 95 to a body mount 4 provided on the front face of the camera body 3. The interchangeable lens unit 2 includes an optical system L with an optical axis AZ. One feature of the digital camera 1 is in the positional relation of the various parts around a focus lens L5. This positional relation of the various parts will be discussed in detail below.

Figure 3:
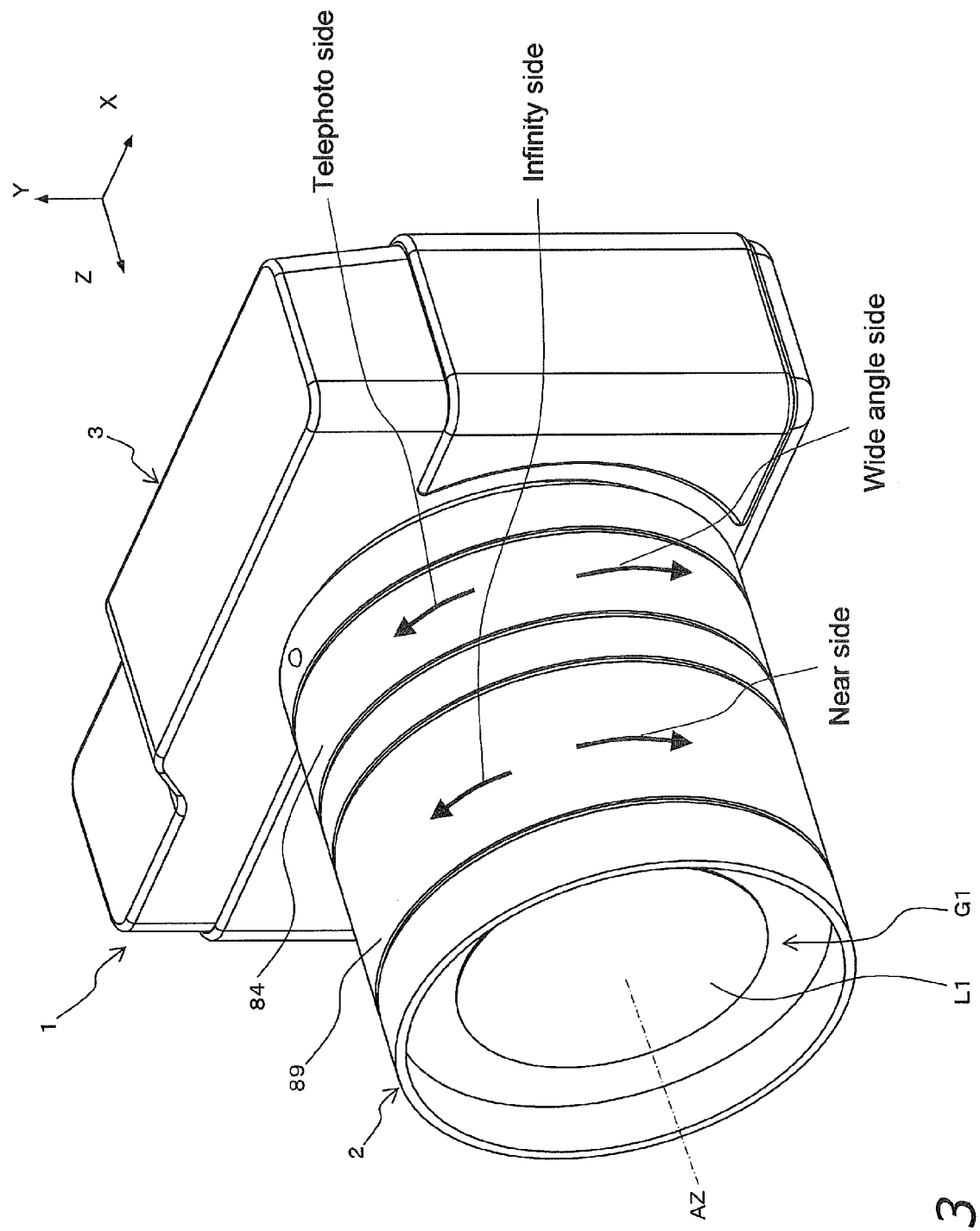
FIG. 3 is a simplified oblique view of the digital camera.

As best shown in FIG. 3, a three-dimensional coordinate system is used as a reference to refer to components of the digital camera 1. The optical axis AZ of the optical system L (discussed below) coincides with the Z-axis direction (an example of the first direction). The X-axis direction coincides with the vertical direction when the digital camera 1 is in its portrait orientation, and the Y-axis direction coincides with the vertical direction when the digital camera 1 is in its landscape orientation. In the following description, "front" means the Z-axis direction positive side, and "rear" means the Z-axis direction negative side.

Camera Body

The basic configuration of the camera body 3 will be described with reference to FIGS. 1-4B. As shown in FIGS. 1-4B, the camera body 3 has a case 3a, a body mount 4, a control unit 39, an image acquisition unit 35, an image display unit 36, a viewfinder unit 38, and a body microcomputer 10.

(1) Case

Figure 4A:
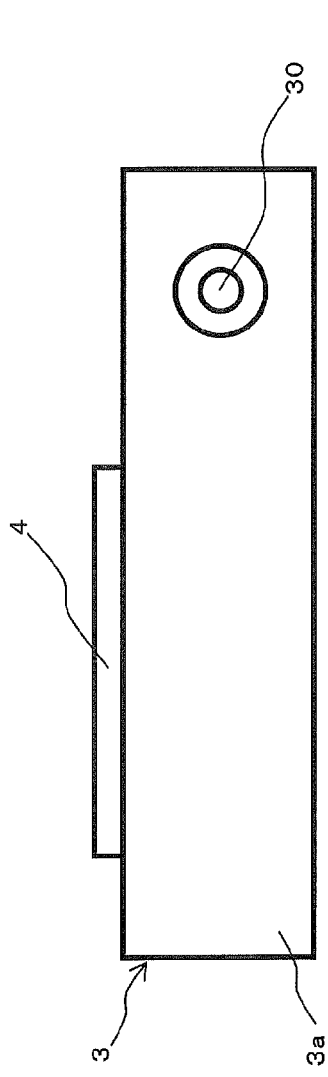
FIG. 4A is a top view of the camera body.
Figure 4B:
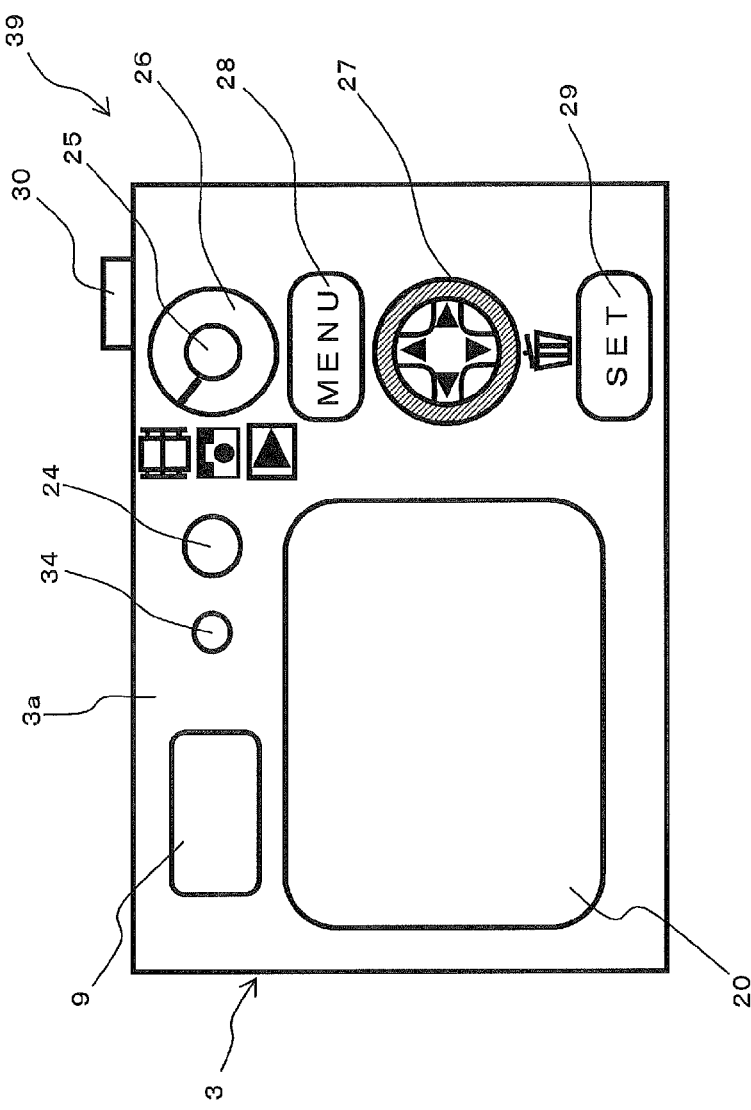
FIG. 4B is a rear view of the camera body.

The case 3a constitutes the outer part of the camera body 3. As shown in FIGS. 4A and 4B, the body mount 4 is connected to the front face of the case 3a, and the control unit 39 is provided on the rear and top faces of the case 3a. More specifically, a display unit 20, a power switch 25, a mode selector dial 26, a navigation key 27, a menu button 28, a setting button 29, an imaging mode selector button 34, and a moving picture imaging button 24 are provided on the rear face of the case 3a. A shutter button 30 is provided on the top face of the case 3a.

(2) Body Mount

The body mount 4 is where the interchangeable lens unit 2 in mounted via the lens mount 95. The body mount 4 has a body-side contact (not shown) that can be electrically connected with a lens-side contact (not shown). The camera body 3 is able to send and receive data to and from the interchangeable lens unit 2 via the body mount 4 and the lens mount 95. For example, the body microcomputer 10 (discussed below) capable of sending the lens microcomputer 40 control signals, i.e. an exposure synchronization signal, via the body mount 4 and the lens mount 95.

(3) Control Unit

As shown in FIGS. 4A and 4B, the control unit 39 has various controls that the user can use to input operating information. In particular, the control unit 39 has the display unit 20, the power switch 25, the mode selector dial 26, the navigation key 27, the menu button 28, the setting button 29, the imaging mode selector button 34, the moving picture imaging button 24, and the shutter button 30.

The power switch 25 is used for turning the power on and off to the digital camera 1 or the camera body 3. When the power is turned on with the power switch 25, power is supplied to the various parts of the camera body 3 and the interchangeable lens unit 2.

The mode selector dial 26 is used to switch the operating modes such as still picture imaging mode, moving picture imaging mode, or reproduction mode, and the user can turn the mode selector dial 26 to switch the operating modes. When the still picture imaging mode is selected with the mode selector dial 26, the operating mode is switched to the still picture imaging mode, and when the moving picture imaging mode is selected with the mode selector dial 26, the operating mode is switched to the moving picture imaging mode. In the moving picture imaging mode, basically moving picture imaging is possible. When the reproduction mode is selected with the mode selector dial 26, the operating mode is switched to the reproduction mode, allowing a captured image to be displayed on the display unit 20.

The navigation key 27 is used to select the left, right, up, and down directions. For example, the navigation key 27 is used to select the desired menu from various menu screens displayed on the display unit 20.

The menu button 28 is for setting the various operations of the digital camera 1. The setting button 29 is for executing the operations presented in the various menus.

The moving picture imaging button 24 is for starting and stopping moving picture imaging. Even if the operating mode selected with the mode selector dial 26 is the still picture imaging mode or the reproduction mode, when the moving picture imaging button 24 is pressed, the operating mode is forcibly changed to the moving picture imaging mode and moving picture imaging begins, regardless of the setting on the mode selector dial 26. When this moving picture imaging button 24 is pressed during moving picture imaging, the moving picture imaging ends and the operating mode changes to the one selected on the mode selector dial 26, that is, to the one prior to the start of moving picture imaging. For example, if the still picture imaging mode has been selected with the mode selector dial 26 when the moving picture imaging button 24 is pressed, the operating mode automatically changes to the still picture imaging mode after the moving picture imaging button 24 is pressed again.

The shutter button 30 is pressed by the user to capture an image. When the shutter button 30 is pressed, a timing signal is outputted to the body microcomputer 10. The shutter button 30 is a two-stage switch that can be pressed halfway down or all the way down. Light measurement and ranging are commenced when the user presses the button halfway down. When the user presses the shutter button 30 all the way down in a state in which the shutter button 30 has been pressed half way down, a timing signal is outputted, and image data is acquired by the image acquisition unit 35.

(4) Image Acquisition Unit

The image acquisition unit 35 comprises an imaging sensor 11 (an example of the imaging element) such as a CCD (Charge Coupled Device) that performs opto-electrical conversion, a shutter unit 33 that adjusts the exposure state of the imaging sensor 11, a shutter controller 31 that controls the drive of the shutter unit 33 on the basis of a control signal from the body microcomputer 10, and an imaging sensor drive controller 12 that controls the operation of the imaging sensor 11.

The imaging sensor 11 is a CCD (Charge Coupled Device) sensor, for example, that converts the optical image formed by the optical system L into an electrical signal. The imaging sensor 11 is driven and controlled according to timing signals produced by the imaging sensor drive controller 12. It should be understood, however, that the imaging sensor 11 is not limited to the use of a CCD sensor. Other devices such as a CMOS (Complementary Metal Oxide Semiconductor) sensor may be employed to achieve the same effect.

The shutter controller 31 drives a shutter drive actuator 32 and operates the shutter unit 33 according to a control signal outputted from the body microcomputer 10 that has received a timing signal.

The auto-focusing method that is employed in this embodiment is a contrast detection method that makes use of image data produced by the imaging sensor 11. Using a contrast detection method allows high-precision focal adjustment.

(5) Body Microcomputer

The body microcomputer 10 is a control device that is the command center of the camera body 3 and controls the various parts of the digital camera 1 according to operation information inputted via the operation unit 39. More specifically, the body microcomputer 10 is equipped with a CPU, ROM, and RAM, and the programs held in the ROM are read by the CPU, allowing the body microcomputer 10 to perform a variety of functions. For instance, the body microcomputer 10 includes the function of detecting when the interchangeable lens unit 2 has been mounted to the camera body 3, or the function of acquiring information necessary for controlling the digital camera 1 such as information regarding the focal distance from the interchangeable lens unit 2. The body microcomputer 10 also controls a focus adjusting unit 72 (discussed below) via the lens microcomputer 40.

The body microcomputer 10 is capable of receiving signals from the power switch 25, the shutter button 30, the mode selector dial 26, the navigation key 27, the menu button 28, and the setting button 29. Various information related to the camera body 3 is held in a memory 10*a* inside the body microcomputer 10. The memory 10*a* is a non-volatile memory and can hold stored information even when no power is being supplied.

Also, the body microcomputer 10 periodically produces a vertical synchronization signal and an exposure synchronization signal on the basis of the vertical synchronization signal in parallel with the production of the vertical synchronization signal. The body microcomputer 10 can produce an exposure synchronization signal, since the body microcomputer 10 ascertains beforehand the exposure start timing and the exposure stop timing, using the vertical synchronization signal as a reference. The body microcomputer 10 outputs a vertical synchronization signal to a timing generator (not shown) and outputs an exposure synchronization signal at a specific period to the lens microcomputer 40 via the body mount 4 and the lens mount 95. The lens microcomputer 40 acquires position information about a focus lens support frame 140 in synchronization with the exposure synchronization signal.

The imaging sensor drive controller 12 produces an electronic shutter drive signal and a read signal of the imaging sensor 11 for a specific period on the basis of the vertical synchronization signal. The imaging sensor drive controller 12 drives the imaging sensor 11 on the basis of the electronic shutter drive signal and the read signal. That is, the imaging sensor 11 reads to a vertical transfer part (not shown) the image data produced by numerous opto-electrical conversion elements (not shown) present in the imaging sensor 11 according to the read signal.

The image signal outputted from the imaging sensor 11 is sent from an analog signal processor 13 and successively processed by an A/D converter 14, a digital signal processor 15, a buffer memory 16, and an image compressor 17. The analog signal processor 13 subjects the image signal outputted from the imaging sensor 11 to gamma processing or other such analog signal processing. The A/D converter 14 converts the analog signal outputted from the analog signal processor 13 into a digital signal. The digital signal processor 15 subjects the image signal converted into a digital signal by the A/D converter 14 to digital signal processing such as noise elimination or contour enhancement. The buffer memory 16 is a RAM (Random Access Memory), and temporarily stores the image signal. The image signal stored in the buffer memory 16 is sent to and processed by first the image compressor 17 and then an image recorder 18. The image signal stored in the buffer memory 16 is read at a command from an image recording controller 19 and sent to the image compressor 17. The data of the image signal sent to the image compressor 17 is compressed into an image signal according to a command from the image recording controller 19. This compression adjusts the image signal to a smaller data size than that of the original data. An example of the method for compressing the image signal is the JPEG (Joint Photographic Experts Group) method in which compression is performed on the image signal for each frame. After this, the compressed image signal is recorded by the image recording controller 19 to the image recorder 18. When a moving picture is recorded, JPEG can also be used to compress a plurality of image signals, compressing an image signal for each frame, and an H.264/AVC method can also be used, in which compression is performed on image signals for a plurality of frames all at once.

The image recorder 18 produces a still picture file or moving picture file that is associated with specific information to be recorded with the image signal, on the basis of a command from the image recording controller 19. The image recorder 18 also records the still picture file or moving picture file on the basis of a command from the image recording controller 19. The image recorder 18 is a removable memory and/or an internal memory, for example. The specific information to be recorded with the image signal includes the date the image was captured, focal distance information, shutter speed information, aperture value information, and imaging mode information. Still picture files are in Exif (registered trademark) format or a format similar to the Exif (registered trademark) format. Moving picture files are in H.264/AVC format or a format similar to the H.264/AVC format.

(6) Image Display Unit

The image display unit 36 includes the display unit 20 and an image display controller 21. The display unit 20 is, for example, a liquid crystal monitor. The display unit 20 displays as a visible image that the image signal recorded to the buffer memory 16 or the image recorder 18 on the basis of a command from the image display controller 21. Possible display modes on the display unit 20 include a display mode in which only the image signal is displayed as a visible image and a display mode in which the image signal and information about the time of capture are displayed as a visible image.

(7) Viewfinder

The viewfinder unit 38 has a liquid crystal viewfinder 8 that displays the image acquired by the imaging sensor 11 and a viewfinder eyepiece window 9 provided on the rear face of the case 3*a*. The user looks into the viewfinder eyepiece window 9 to view the image displayed on the liquid crystal viewfinder 8.

Interchangeable Lens Unit

The basic configuration of the interchangeable lens unit 2 will be described. As shown in FIG. 1, the interchangeable lens unit 2 has the optical system L, a lens support mechanism 71 that supports the optical system L, a focus adjusting unit 72, an aperture adjusting unit 73, a blur correction unit 150, and the lens microcomputer 40.

(1) Optical System

Figure 5:
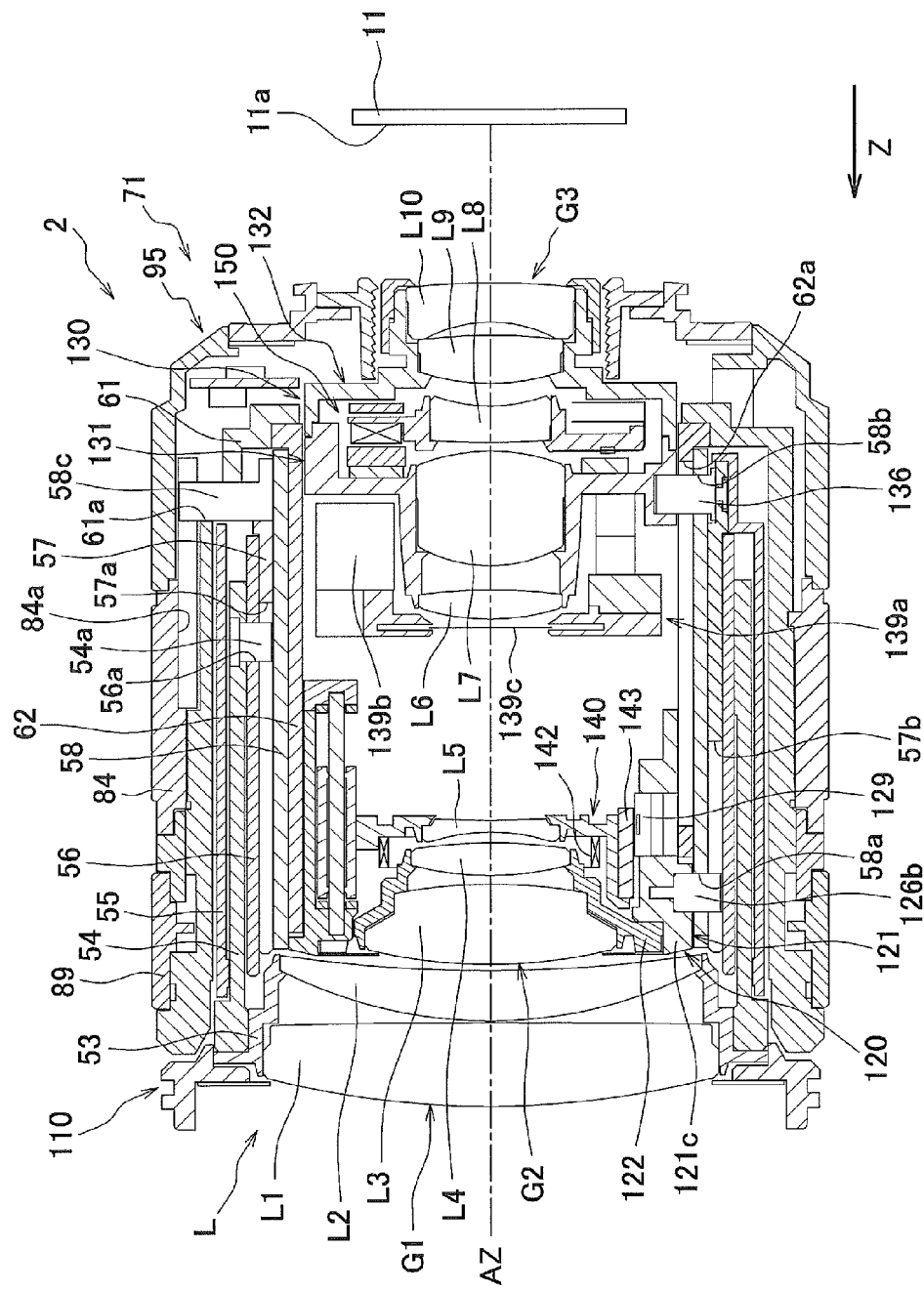
FIG. 5 is a simplified cross section of an interchangeable lens unit (wide angle end)
Figure 6:
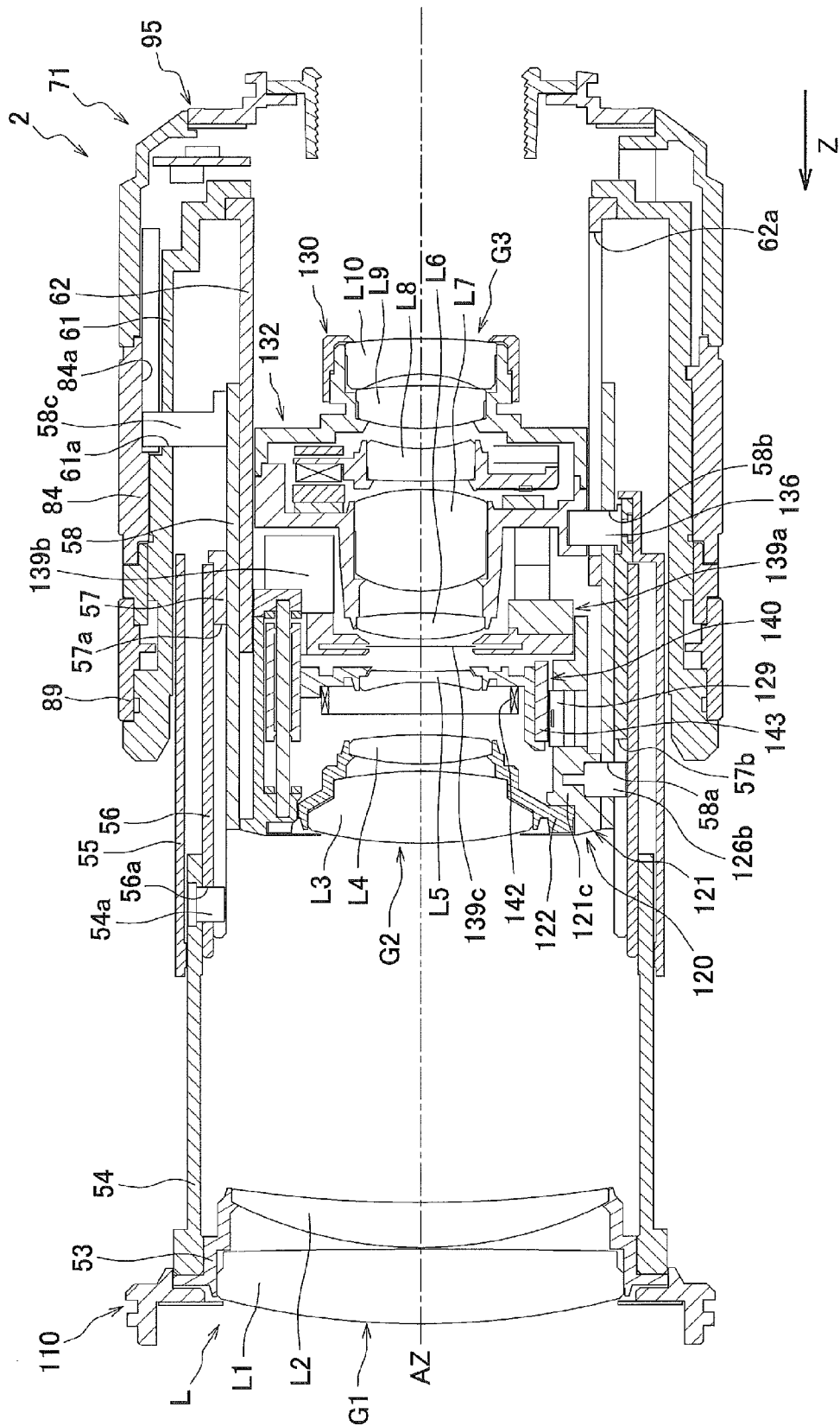
FIG. 6 is a simplified cross section of the interchangeable lens unit (telephoto end)

As shown in FIGS. 5 and 6, the optical system L is a zoom lens system for forming an optical image of a subject and has a first lens group G1, a second lens group G2, a third lens group G3, a focus lens L5 (an example of a first lens element) and a correcting lens L8.

The first lens group G1 includes, but is not limited to, a first lens L1 and a second lens L2 disposed on the imaging sensor 11 side of the first lens L1. The first lens L1 and the second lens L2 are fixed to a first lens group support frame 53 (discussed below) using an adhesive bond or thermal caulking.

The second lens group G2 includes a third lens L3 and a fourth lens L4 (an example of a second lens element) disposed on the imaging sensor 11 side of the third lens L3. The third lens L3 and the fourth lens L4 are fixed to a second lens group support frame 122 (discussed below) using an adhesive bond or thermal caulking.

The third lens group G3 includes a sixth lens L6, a seventh lens L7 (an example of a first optical element), a ninth lens L9 (an example of a second optical element), and a tenth lens L10. The seventh lens L7 and the ninth lens L9 are arranged in the Z-axis direction and spaced apart enough for the correcting lens L8 to be disposed therein between. The sixth lens L6 and the seventh lens L7 are fixed to a front support frame 131 (discussed below) using an adhesive bond. The ninth lens L9 and the tenth lens L10 are fixed to a rear support frame 132 (discussed below) using an adhesive bond or thermal caulking.

The focus lens L5 is used for adjusting the subject distance of the optical system L and is disposed in alignment with the fourth lens L4 in the Z-axis direction. More precisely, the focus lens L5 is disposed in the Z-axis direction between the second lens group G2 and the third lens group G3. In other words, the optical system L is an inner focus type of optical system. The focus lens L5 is a biconcave lens and is fixed to the focus lens support frame 140 using an adhesive bond or thermal caulking. The focus lens L5 is movably supported in the Z-axis direction by the focus lens support frame 140 with respect to the second lens group G2.

The correcting lens L8 is a positive meniscus lens for blur correction and has a convex side facing the imaging sensor 11. The correcting lens L8 is fixed to a correcting lens support frame 151 (discussed below) by adhesive bonding or thermal caulking. The correcting lens L8 is supported by the correcting lens support frame 151 and is movable in a direction perpendicular to the optical axis AZ with respect to the third lens group G3, and to be movable integrally with the third lens group G3 in the Z-axis direction.

(2) Lens Support Mechanism

As shown in FIGS. 5 and 6, the lens support mechanism 71 is a mechanism for movably supporting the optical system L and includes a first lens group support unit 110, a second lens group support unit 120 (an example of the second support frame), the focus lens support frame 140 (an example of the first support frame), and a third lens group support unit 130.

The first lens group support unit 110 includes the first lens group support frame 53 and a first holder 54. The first lens group G1 is fixed to the first lens group support frame 53. The first lens group support frame 53 is fixed to the end of the first holder 54 on the subject side. The first holder 54 has three first cam pins 54a disposed at the end on the imaging sensor 11 side. The first cam pins 54a are inserted into the three cam grooves 56a of the ring member 56 and the three first linear grooves 57a of a linear frame 57.

As shown in FIGS. 5 to 10, the second lens group support unit 120 includes a second holder 121, the second lens group support frame 122, a cosmetic sheet 123, three second cam pins 126a to 126c (an examples of cam followers), a first guide pole 121b, a second guide pole 121g, a first fixing plate 121d, and a second fixing plate 121f.

The second cam pin 126a is an example of the first cam follower, the second cam pin 126b is an example of the second cam follower, and the second cam pin 126c is an example of the third cam follower. However, it will be appreciated by those skilled in the art that the particular fixing portions 121p to 121r may be readily modified in view of the disclosure contained herein to optimally accommodate different types of cam followers. For example, instead of the second cam pins 126a to 126c, cam rollers and the like may be used.

The second holder 121 is a substantially cylindrical member and is arranged on the inner peripheral side of a second fixing frame 62. The second holder 121 has a substantially cylindrical main body portion 121c and the three second cam pins 126a to 126c fixed to the main body portion 121c. The second cam pins 126a to 126c are substantially solid cylindrical members and have center axes C1, C2, and C3, respectively.

Three fixing portions 121p to 121r to which the second cam pins 126a to 126c are fixedly held are formed on the main body portion 121c. The second cam pins 126a to 126c are arranged to protrude outward in the radial direction from the fixing portions 121p to 121r.

The second cam pins 126a to 126c are arranged in the circumferential direction around the optical axis AZ. More specifically, the center axes C1, C2, and C3 of the second cam pins 126a to 126c are arranged in the circumferential direction around and perpendicular to the optical axis AZ. The "circumferential direction" referred to here is defined as an arc-shaped direction around the optical axis AZ. It is preferred, but not necessary, that the second cam pins 126a to 126c be equally spaced apart. The second cam pins 126a to 126c are inserted to first cam grooves 58a in the second lens support frame 58 and second linear grooves 57b in the linear frame 57.

The second lens group support frame 122 is fixed to the end of the second holder 121 on the subject side. The second lens group G2 is fixed to the second lens group support frame 122. The annular cosmetic sheet 123 is fixed to the second lens group support frame 122. The fourth lens L4 is fixed to the end of the second lens group support frame 122 on the focus lens support frame 140 side and this end is designed to be smaller than a coil 142. Therefore, when the focus lens L5 is closest to the fourth lens L4, it comes in on the inner peripheral side of the coil 142. In other words, the coil 142 is movable through the space on the outer peripheral side of the fourth lens L4. When viewed in the radial direction perpendicular to the optical axis AZ, it can be said that part of the range of movement of the coil 142 overlaps with the second lens group support frame 122 and the fourth lens L4.

The first guide pole 121b is fixed by the first fixing plate 121d to the second holder 121 and supports the focus lens support frame 140 movably in the Z-axis direction. The second guide pole 121g is fixed by the second fixing plate 121f to the second holder 121 and this prevents the focus lens support frame 140 from rotating around the first guide pole 121b. The first guide pole 121b and the second guide pole 121g allow the focus lens L5 to move in the Z-axis direction with respect to the second lens group L2.

A first rubber plate 128a formed from rubber is fixed to the second holder 121. A second rubber plate 128b formed from rubber is fixed to the first fixing plate 121d. The first rubber plate 128a and the second rubber plate 128b reduce contact noise when the focus lens support frame 140 hits the second holder 121 and the first fixing plate 121d.

FIGS. 11A and 11B are simplified oblique views of the focus lens support frame 140. As shown in FIGS. 11A and 11B, the focus lens support frame 140 supports the focus lens L5 and includes a support frame main body 141 fixed to the focus lens L5, a first guide portion 141a, a second guide portion 141b, and a protrusion 141c.

The coil 142 (discussed below) of a focus drive unit 160 is fixed to the support frame main body 141, for example, by an adhesive bond. A flexible printed wiring 144 is connected to the coil 142. The first guide pole 121b is inserted into the first guide portion 141a. The second guide pole 121g is inserted into the second guide portion 141b. The first guide pole 121b and the second guide pole 121g support the focus lens support frame 140 movably in the Z-axis direction with respect to the second lens group support unit 120. The protrusion 141c is the portion detected by a photosensor 124 and protrudes toward the outer peripheral side from the support frame main body 141.

As shown in FIGS. 13 to 16, the third lens group support unit 130 has a front support frame 131 (an example of a first support member), a rear support frame 132 (an example of a second support member), three third cam pins 136, and an aperture mechanism 139a.

The front support frame 131 is a substantially annular member disposed on the subject side of the blur correction unit 150 and includes a front support frame main body 131c (an example of a first main body portion), a front protrusion 131a (an example of a first protrusion) protruding in the Z-axis direction from the outer peripheral part of the front support frame main body 131c, a plurality of front contact portions 131b (an example of first contact portions) protruding in the Z-axis direction from the front protrusion 131a, a front cylindrical portion 131d protruding in the Z-axis direction from the front support frame main body 131c, and three front fixing portions 131e. The front protrusion 131a and the front contact portions 131b form a first positioning portion 131g that positions the front support frame 131 and the rear support frame 132. The sixth lens L6 and the seventh lens L7 are fixed to the front cylindrical portion 131d by employing an adhesive bond or thermal caulking.

The three third cam pins 136 are fixed to the outer peripheral side of the front support frame main body 131c. The third cam pins 136 are arranged in the circumferential direction around the front support frame main body 131c. It is preferred, but not necessary, that the third cam pins 136 be equally spaced apart. Since the linear frame 57 (discussed below) is fixed to the distal ends of the third cam pins 136, the linear frame 57 moves integrally with the third lens group support unit 130. The third cam pins 136 are inserted into linear grooves 62a of the second fixing frame 62. Screws (not shown) are fitted into the front fixing portions 131e when fixing the rear support frame 132 to the front support frame 131.

The rear support frame 132 is a substantially annular member disposed on the imaging sensor 11 side of the blur correction unit 150 and includes a rear support frame main body 132c (an example of a second main body), a rear protrusion 132a (an example of a second protrusion) that protrudes to the front support frame 131 side in the Z-axis direction from the outer peripheral side of the rear support frame main body 132c, a plurality of rear contact portions 132b (an example of a second contact portion) that protrude towards the front support frame 131 side in the Z-axis direction from the rear protrusion 132a, and three rear fixing portions 132e that protrude in the Z-axis direction from the rear support frame main body 132c. The rear support frame main body 132c is disposed opposite and spaced apart from the front support frame main body 131c in the Z-axis direction. The rear protrusion 132a and the rear contact portions 132b form a second positioning portion 132g for positioning the front support frame 131 and the rear support frame 132.

The ninth lens L9 and the tenth lens L10 are fixed to a rear cylindrical portion 132d by an adhesive bonding or thermal caulking. A cap 133 is fitted to the rear cylindrical portion 132d. The cap 133 presses the tenth lens L10 against the ninth lens L9. Screws (not shown) are inserted into the rear fixing portions 132e in order to fix the rear support frame 132 to the front support frame 131. The rear fixing portions 132e come into contact with the front fixing portions 131e in the Z-axis direction. As such, the positioning of the rear support frame 132 and the front support frame 131 in the Z-axis direction is performed by the front fixing portions 131e and the rear fixing portions 132e.

Figure 17:
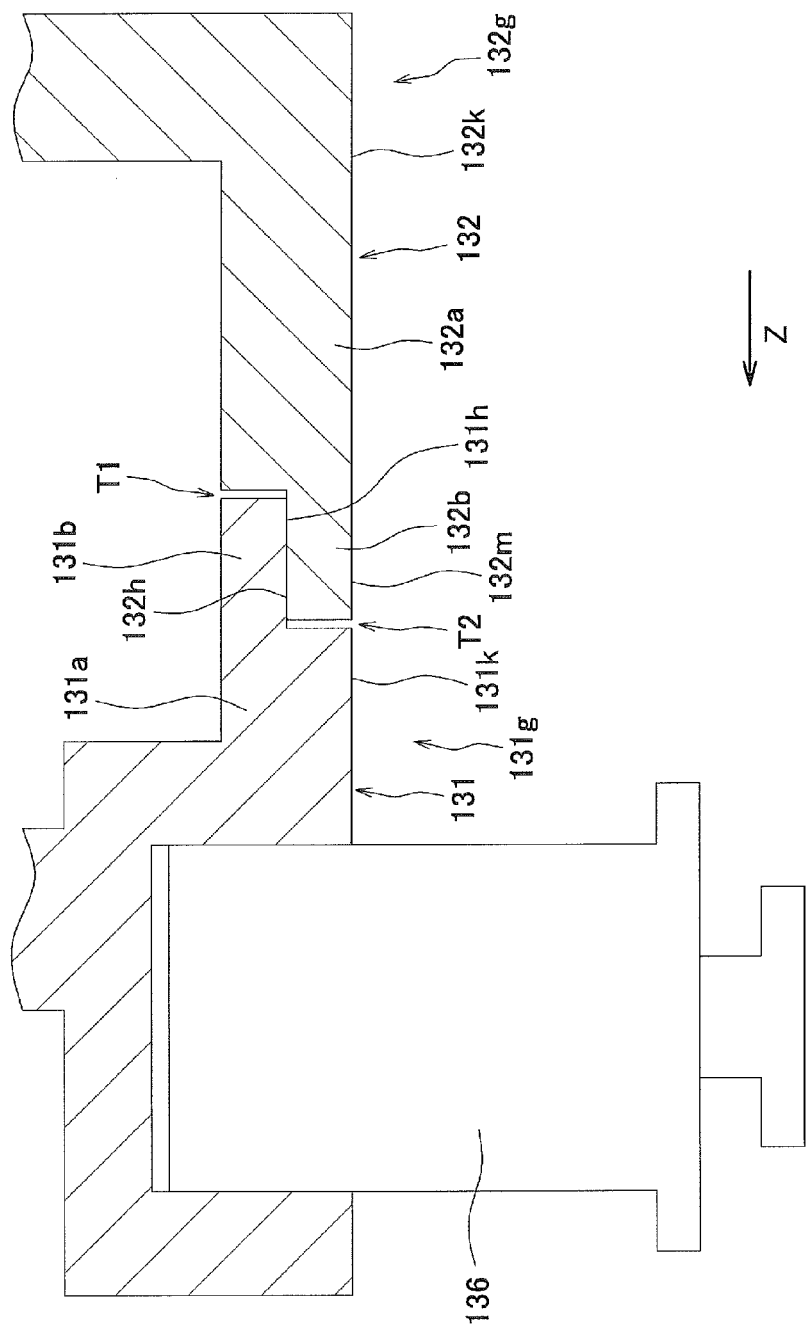
FIG. 17 is a partial cross section of the third lens group support unit.

As shown in FIG. 17, the front contact portions 131b, which are thinner than the front protrusion 131a, are formed at the end of the front protrusion 131a. A first contact face 131h on the outside of the front contact portions 131b in the radial direction is disposed further to the inside in the radial direction than a first outer peripheral face 131k on the outside of the front protrusion 131a in the radial direction. That is, a step is formed by the front protrusion 131a and the front contact portions 131b.

The front protrusion 131a is a substantially annular portion whose center is concentric with the optical axis AZ and is disposed on the outer peripheral side of the correcting lens support frame 151. The front contact portions 131b are arc-shaped portions whose center is concentric with the optical axis AZ. The first contact face 131h of the front contact portions 131b is an arc-shaped face whose center is concentric with the optical axis AZ.

The rear contact portions 132b, which are thinner than the rear protrusion 132a, are formed at the end of the rear protrusion 132a. An outer peripheral face 132m on the outside of the rear contact portions 132b in the radial direction is disposed at the same radial position as a second outer peripheral face 132k on the outside of the rear protrusion 132a in the radial direction and forms the same face. A second contact face 132h is formed inside the rear contact portions 132b in the radial direction. A step is formed by the front protrusion 131a and the front contact portions 131b.

The rear protrusion 132a is a substantially annular portion whose center is concentric with the optical axis AZ and is disposed on the outer peripheral side of the correcting lens support frame 151. The rear contact portions 132b are an arc-shaped portion whose center is concentric with the optical axis AZ. The second contact face 132h of the rear contact portions 132b is an arc-shaped face whose center is concentric with the optical axis AZ.

The rear contact portions 132b are disposed on the outside of the front contact portions 131b in the radial direction, and the second contact face 132h radially comes into contact with the first contact face 131h of the front contact portions 131b on a circumference whose center is concentric with the optical axis AZ.

When the front fixing portions 131e and the rear fixing portions 132e are in contact in the Z-axis direction, a gap T1 is created between the front contact portions 131b and the rear protrusion 132a. Also, a gap T2 is created between the rear contact portions 132b and the front protrusion 131a. That is, the front contact portions 131b and the rear contact portions 132b are not involved in the position of the front support frame 131 and the rear support frame 132 in the Z-axis direction, and only perform positioning of the front support frame 131 and the rear support frame 132 in the radial direction.

Also, as shown in FIGS. 14A to 16, the rear support frame 132 has a protrusion 132n that protrudes in the Z-axis direction from the rear protrusion 132a. A cut-out 131n into which the protrusion 132n is fitted is formed in the front support frame 131. Consequently, during assembly, for example, it is easier to position the rear support frame 132 around the optical axis AZ with respect to the front support frame 131.

Further, a cut-out 131p is formed in the front protrusion 131a, and a cut-out 132p is formed in the rear protrusion 132a. The cut-out 131p and the cut-out 132p are arranged at substantially the same position in the circumferential direction. Flexible printing wiring 138b connected to an electrical substrate 138a is arranged in the cut-out 131p and the cut-out 132p.

As shown in FIGS. 13 to 16, the aperture mechanism 139a is fixed on the subject side of the front support frame 131. The aperture blades 139c of the aperture mechanism 139a are driven open and closed by an aperture drive motor 139b. The electrical substrate 138a is connected to the aperture drive motor 139b.

In order to mechanically drive the first lens group support unit 110, the second lens group support unit 120 and the third lens group support unit 130, the lens support mechanism 71 further includes, as best shown in FIGS. 5 and 6, the lens mount 95, a first fixing frame 61, the second fixing frame 62, a zoom ring 84, a focus ring 89, a focus ring angle detector 90, a first rotary frame 58, a second rotary frame 56, the linear frame 57, and a cosmetic frame 55.

The lens mount 95 is mounted to the body mount 4 of the camera body 3 and has a lens-side contact (not shown). The first fixing frame 61 is fixed to the lens mount 95 and rotatably supports the zoom ring 84 and the focus ring 89 with respect to the lens mount 95. The first fixing frame 61 has one through-groove 61a. This through-groove 61a is used to prevent interference between the first fixing frame 61 and a cam pin 58c (discussed below) of the first rotary frame 58. The cam pin 58c is inserted into the through-groove 61a.

The second fixing frame 62 is fixed to the first fixing frame 61 and rotatably supports the first rotary frame 58. The second fixing frame 62 has three linear grooves 62a for limiting the rotation of the linear frame 57 and the third lens group support unit 130 and three cam pins (not shown) for guiding the first rotary frame 58.

The first rotary frame 58 is a member for driving the second lens group support unit 120 and the third lens group support unit 130 in the Z-axis direction relative to the lens mount 95. The first rotary frame 58 includes three first cam grooves 58a, three second cam grooves 58b, three third cam grooves (not shown), and one cam pin 58c. The second cam pins 126a to 126c are inserted into the three first cam grooves 58a, respectively. Third cam pins 136 (discussed below) are inserted into the second cam grooves 58b. The cam pins of the second fixing frame 62 are inserted into the third cam grooves, and the first rotary frame 58 is guided by the third cam grooves in the Z-axis direction with respect to the second fixing frame 62 and the cam pins of the second fixing frame 62.

Also, the cam pin 58c is inserted into a single linear groove 84a provided on the zoom ring 84. Rotation of the zoom ring 84 is transmitted to the first rotary frame 58 when movement of the first rotary frame 58 in the Z-axis direction with respect to the zoom ring 84 is permitted by the cam pin 58c and the linear groove 84a.

The second rotary frame 56 is constructed to drive the first lens group support unit 110 in the Z-axis direction with respect to the lens mount 95 and includes the three cam grooves 56a. The first cam pins 54a of the first holder 54 are inserted into the three cam grooves 56a. The second rotary frame 56 is connected via a plurality of link pins (not shown) so as to rotate integrally with the first rotary frame 58 and move in the Z-axis direction. Accordingly, rotation of the zoom ring 84 is transmitted through the first rotary frame 58 to the second rotary frame 56. The plurality of link pins are inserted into through-grooves (not shown) of the linear frame 57. The second rotary frame 56 is arranged to move integrally in the Z-axis direction and to be rotatable with respect to the linear frame 57.

The linear frame 57 is a member for limiting the rotation of the first lens group support unit 110 and the second lens group support unit 120 with respect to the lens mount 95 and is fixed to the third lens group support unit 130 via the third cam pins 136. The cosmetic frame 55 is used to prevent unwanted light from coming into the lens unit 2 and is fixed to the linear frame 57. The third cam pins 136 are inserted into the linear grooves 62a of the second fixing frame 62. With this constitution, the linear frame 57 moves in the Z-axis direction integrally with the cosmetic frame 55 and the third lens group support unit 130 in a state in which its rotation is limited with respect to the lens mount 95.

The linear frame 57 has three first linear grooves 57a and three second linear grooves 57b. The first cam pins 54a are inserted into the first linear grooves 57a. The second cam pins 126a to 126c are inserted into the three second linear grooves 57b, respectively. The first lens group support unit 110 is guided in the Z-axis direction with respect to the lens mount 95 in such a way in which its rotation is limited with respect to the lens mount 95, by the first cam pins 54a and the first linear grooves 57a. Also, the second cam pins 126a to 126c and the second linear grooves 57b guide the second lens group support unit 120 in the Z-axis direction with respect to the lens mount 95 in such a way that its rotation is limited with respect to the 95.

The zoom ring 84 has a cylindrical shape and is supported rotatably around the optical axis AZ in a state in which its movement in the Z-axis direction is limited by the first fixing frame 61. The zoom ring 84 has a linear groove 84a that extends in the Z-axis direction. The cam pin 58c of the first rotary frame 58 is inserted into the linear groove 84a. As a result, the first rotary frame 58 rotates integrally with the zoom ring 84 around the optical axis AZ.

The rotational position of the zoom ring 84 can be detected by a linear position sensor 87. The "rotational position of the zoom ring 84" means the position of the zoom ring 84 in the rotational direction, and can also be considered to be the rotational angle of the zoom ring 84 from a starting point position.

The linear position sensor 87 detects the rotational position and rotational direction of the zoom ring 84 and sends the detection result to the lens microcomputer 40. More specifically, the linear position sensor 87 has a slider (not shown) that protrudes outwardly in the radial direction and is fixed to the first fixing frame 61. This slider is inserted into a cam groove (not shown) formed in the zoom ring 84. When the zoom ring 84 rotates relative to the first fixing frame 61, the slider moves in the Z-axis direction along the cam groove. The linear position sensor 87 includes a variable resistor and sliders over a magnetic resistor that is inside this variable resistor, which allows output (output voltage) proportional to the position of the slider in the Z-axis direction to be obtained linearly between terminals to which a specific voltage has been applied at the ends. The rotational position of the zoom ring 84 can be detected by converting the output of the linear position sensor 87 into rotational position information.

Since the first lens group G1 through to the fourth lens group G4 are mechanically linked via the lens support mechanism 71, the absolute positions of the first to fourth lens groups (such as a position using the light receiving face 11a of the imaging sensor 11 as a reference) have a specific relation to the rotational position of the zoom ring 84. Therefore, the absolute positions of the first to fourth lens groups G1 to G4 with respect to the lens mount 95, for example, can be ascertained by detecting the rotational position of the zoom ring 84. The other structure such as a movable lever may be applied instead of the zoom ring 84.

The focus ring 89 has a cylindrical shape, and is supported rotatably around the optical axis AZ in a state in which its movement in the Z-axis direction is limited by the first fixing frame 61. The rotational angle and rotational direction of the focus ring 89 can be detected by a photosensor or other such focus ring angle detector 90.

(3) Focus Adjusting Unit

As shown in FIG. 1, the focus adjusting unit 72 has the focus drive unit 160 (an example of a drive unit), a focus drive controller 41, a photosensor 124, and an MR sensor 129 (an example of a position sensor).

The focus drive unit 160 is an electromagnetic actuator for driving the focus lens support frame 140 in the Z-axis direction with respect to the second lens group support unit 120 (more precisely, driving the focus lens L5 with respect to the second lens group G2) and includes the coil 142 for transmitting an electrical current, a first magnetic field generator 125, and a second magnetic field generator 127. It should be understood from the drawings and the disclosure contained herein that the drive unit 160 could be, in the alternative, an electromagnetic actuator having a stepping motor, a DC motor, a piezoelectric actuator, or another such actuator that can convert electrical power into drive force.

The coil 142 is arranged to surround the focus lens L5 when viewed in the Z-axis direction. The coil 142 is fixed by adhesive bonding to the support frame main body 141 of the focus lens support frame 140. The coil 142 has a hexagonal shape when viewed in the Z-axis direction and is formed by coiling wire in a cylindrical shape. The coil 142 is connected to the focus drive controller 41 and electrical current corresponding to the voltage supplied from the focus drive controller 41 is sent to the coil 142.

The first magnetic field generator 125 is arranged opposite to and facing the coil 142 and forms a magnetic field around the coil 142. The first magnetic field generator 125 is disposed inside the second holder 121. The first magnetic field generator 125 includes a first magnet 125a, a substantially U-shaped first main yoke 125b, and a first side yoke 125c.

The first magnet 125a is arranged opposite to and facing the coil 142 and is fixed on the inside of the first main yoke 125b. The first main yoke 125b is fixed on the inside of the second holder 121. In other words, the first magnet 125a is supported by the second holder 121 via the first main yoke 125b.

The first magnet 125a has a rectangular first reference face P1 (an example of a first face or first surface) disposed opposite to and facing the coil 142. An imaginary line defined as a first center line 125d passes through the center of and is perpendicular to the first reference face P1. The first center line 125d is an imaginary line determined by the first magnet 125a.

The first side yoke 125c is fixed to the end of the first main yoke 125b. The coil 142 is disposed between the first main yoke 125b and the first magnet 125a. As such, the coil 142 is positioned within the magnetic field formed by the first magnetic field generator 125.

The second magnetic field generator 127 is arranged opposite to and facing the coil 142, and forms a magnetic field around the coil 142. The second magnetic field generator 127 is disposed inside the second holder 121. The second magnetic field generator 127 has a second magnet 127a, a substantially U-shaped second main yoke 127b, and a second side yoke 127c.

The second magnet 127a is arranged opposite to and facing the coil 142 and is fixed on the inside of the second main yoke 127b. The second main yoke 127b is fixed on the inside of the second holder 121. In other words, the second magnet 127a is supported by the second holder 121 via the second main yoke 127b.

The second magnet 127a has a rectangular second reference face P2 (an example of a second face or a second surface) disposed opposite to and facing the coil 142. An imaginary line defined as a second center line 127d passes through the center of and is perpendicular to the second reference face P2. The second center line 127d is an imaginary line determined by the second magnet 127a.

The second side yoke 127c is fixed to the end of the second main yoke 127b. Since the coil 142 is disposed between the second main yoke 127b and the second magnet 127a, the coil 142 is positioned within the magnetic field formed by the second magnetic field generator 127.

The focus lens support frame 140, with respect to the second lens group support unit 120, is electrically driven by just the focus drive unit 160. When no power is supplied to the focus drive unit 160, no drive force acts on the focus lens support frame 140. As such, the focus lens support frame 140 can move in the Z-axis direction with respect to the second lens group support unit 120. In this state, the first rubber plate 128a and the second rubber plate 128b function as cushioning members between the second lens group support unit 120 and the focus lens support frame 140.

The position of the focus lens support frame 140, with respect to the second lens group support unit 120, can be detected by the photosensor 124 and the MR sensor 129. More specifically, the photosensor 124 is used to detect whether or not the focus lens support frame 140 is disposed in a specific position with respect to the second lens group support unit 120 and is fixed to the second holder 121. The photosensor 124 has a light emitting part (not shown) and a light receiving part (not shown). The light emitting part and light receiving part form a detection area. The protrusion 141c of the focus lens support frame 140 is able to pass through this detection area, and it can be detected when the protrusion 141c is disposed within the detection area. In other words, the photosensor 124 is a detector of the starting point of the focus lens support frame 140. The lens microcomputer 40 can recognize that the focus lens support frame 140 (focus lens L5) is in the starting point position, which serves as a reference during focal adjustment.

The MR sensor 129 is used to detect the position (more precisely, the movement distance) of the focus lens support frame 140 with respect to the second lens group support unit 120 by utilizing a sensor magnet 143. The sensor magnet 143 is fixed to the focus lens support frame 140, and the MR sensor 129 is disposed near (or operatively coupled to) the sensor magnet 143. Also, the MR sensor 129 is disposed on the opposite side of the sensor magnet 143 from the focus lens L5.

The sensor magnet 143 is constructed so that it is slender in the Z-axis direction and the N and S poles are alternately magnetized at a specific pitch in the Z-axis direction. When the sensor magnet 143 moves, the sensor magnet 143 produces a magnetic field. The MR sensor 129 moves through this magnetic field. Here, since the signal outputted from the MR sensor 129 varies with the magnetic field, the lens microcomputer 40 can calculate the movement distance of the focus lens support frame 140 with respect to the second lens group support unit 120 on the basis of that signal outputted from the MR sensor 129.

The focus drive controller 41 is a unit for controlling the focus drive unit 160 and is electrically connected to the focus drive unit 160 and the focus lens support frame 140. The focus drive controller 41 drives the focus drive unit 160 on the basis of a control signal sent from the lens microcomputer 40. More specifically, the lens microcomputer 40 sends a control signal to the focus drive controller 41 on the basis of a target value and the detection result of the MR sensor 129. The focus drive controller 41 applies voltage to the coil 142, with the amount of voltage based on this control signal. This allows the focus lens L5 to be moved to a specific position with respect to the second lens group G2.

With this digital camera 1, in order to achieve a zoom lens system with which the focal distance can be varied while keeping the subject distance substantially constant, the focus lens support frame 140 is driven by the focus adjusting unit 72 on the basis of a tracking table (not shown) stored ahead of time in the lens microcomputer 40. The tracking method here is called electronic tracking.

The tracking table consists of information indicating the position of the focus lens support frame 140 at which there is substantially no change in the subject distance at which the subject is in focus even if the focal distance changes (more precisely, the position of the focus lens support frame 140 with respect to the second holder 121). The phrase "the subject distance is substantially constant" means that the amount of change in the subject distance is within a specific subject field depth.

The starting point position that can be detected by the photosensor 124 is an absolute position at which there can be no movement with respect to the second holder 121. Accordingly, when the position of the focus lens support frame 140 is reset to the starting point position with respect to the second holder 121, the focus lens support frame 140 is driven to the position where the starting point position detection-use protrusion 141c is detected by the photosensor 124. For example, when the power switch 25 of the digital camera 1 is turned off, the focus lens support frame 140 is driven by the focus drive unit 160 to the position where the protrusion 141c of the focus lens support frame 140 is detected by the photosensor 124, regardless of the current position of the focus lens support frame 140. Once the drive of the focus lens support frame 140 is complete, the power is turned off to the digital camera 1. Conversely, when the power switch 25 of the digital camera 1 is turned on, the focus lens support frame 140 is driven by the focus drive unit 160 to a specific position found on the basis of a tracking table. The starting point detector is not limited to a photosensor and may instead be, for example, a combination of a magnet and a magnetic sensor.

(4) Aperture Adjusting Unit

As best shown in FIG. 1, the aperture adjusting unit 73 includes the aperture mechanism 139a fixed to the front support frame 131, the aperture drive motor 139b that drives the aperture mechanism 139a, and an aperture drive controller 42 that controls the aperture drive motor 139b. The aperture drive motor 139b is, for example, a stepping motor and is driven on the basis of a drive signal inputted from the aperture drive controller 42. The drive force generated by the aperture drive motor drives aperture blades 139c in the opening and closing directions. The aperture value of the optical system L can be changed by driving the aperture blades 139c.

(5) Blur Correction Unit

Figure 13:
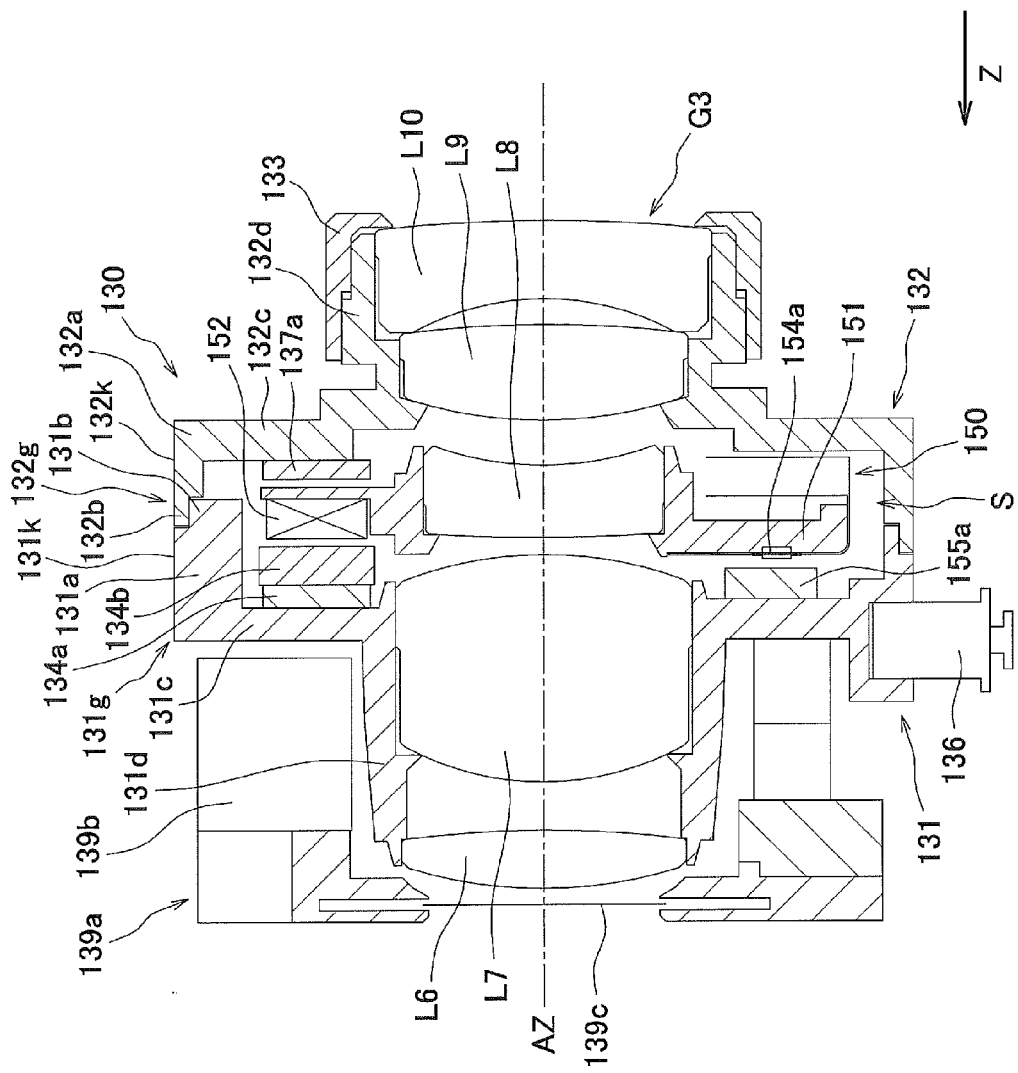
FIG. 13 is a simplified cross section of a third lens group support unit.

As shown in FIGS. 5 and 13, the blur correction unit 150 is for reducing blurring of the optical image with respect to the imaging sensor 11, which is attributable to movement of the interchangeable lens unit 2 and the camera body 3. The blur correction unit 150 drives the correcting lens support frame 151 in a direction perpendicular to the optical axis AZ. More specifically, the blur correction unit 150 includes the correcting lens support frame 151, a first correction drive unit 155, a second correction drive unit 156, an electrical substrate 158, flexible printed wiring 159 connected to the electrical substrate 158, a first position sensor 154a, a second position sensor 154b, a first detection magnet 155a, a second detection magnet 155b, and a blur correction microcomputer 48.

As shown in FIG. 13, the blur correction unit 150 is disposed in the interior of the third lens group support unit 130 (more precisely, in a space S formed by the front support frame 131 and the rear support frame 132).

Figure 16:
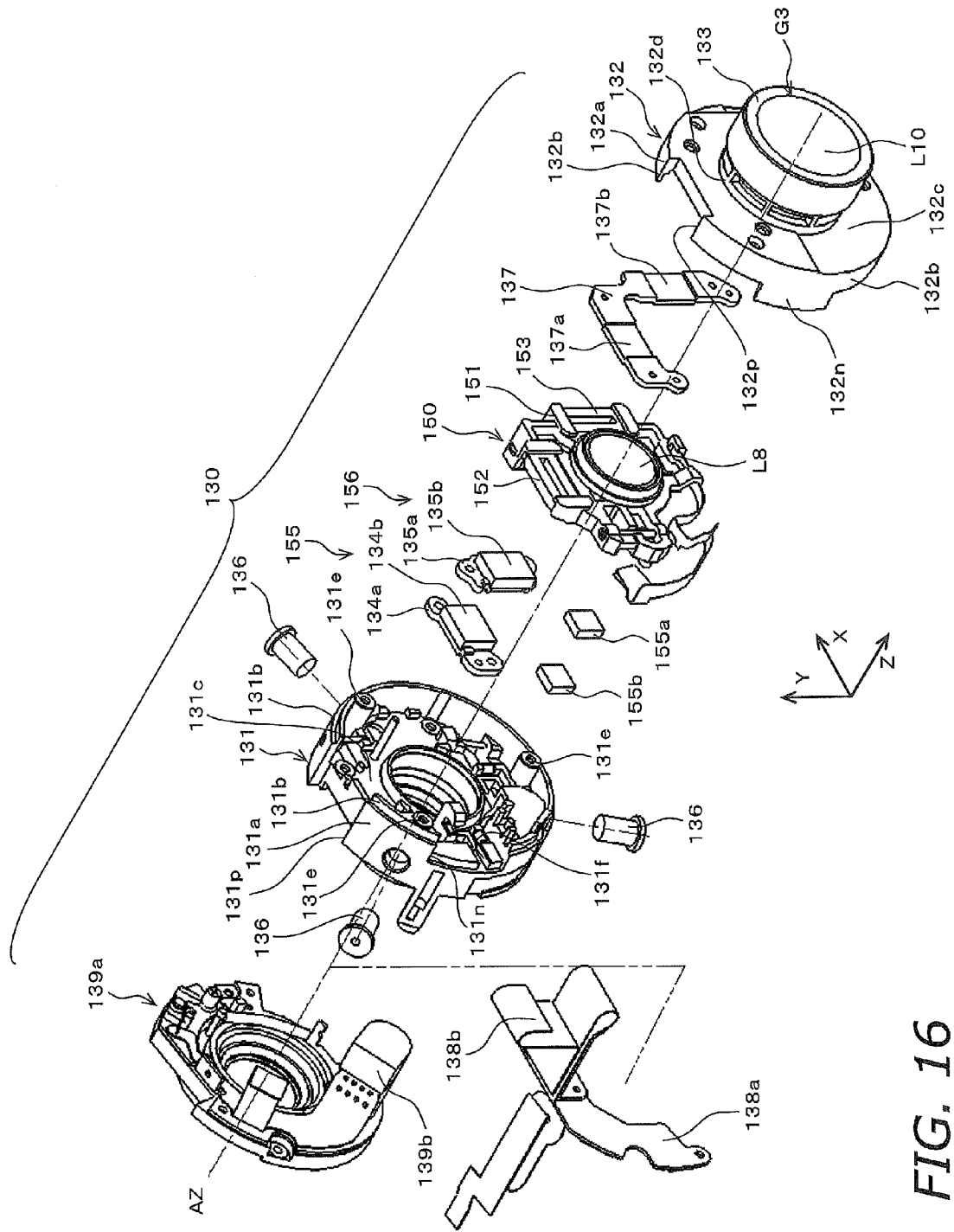
FIG. 16 is an exploded oblique view of the third lens group support unit.
Figure 18:
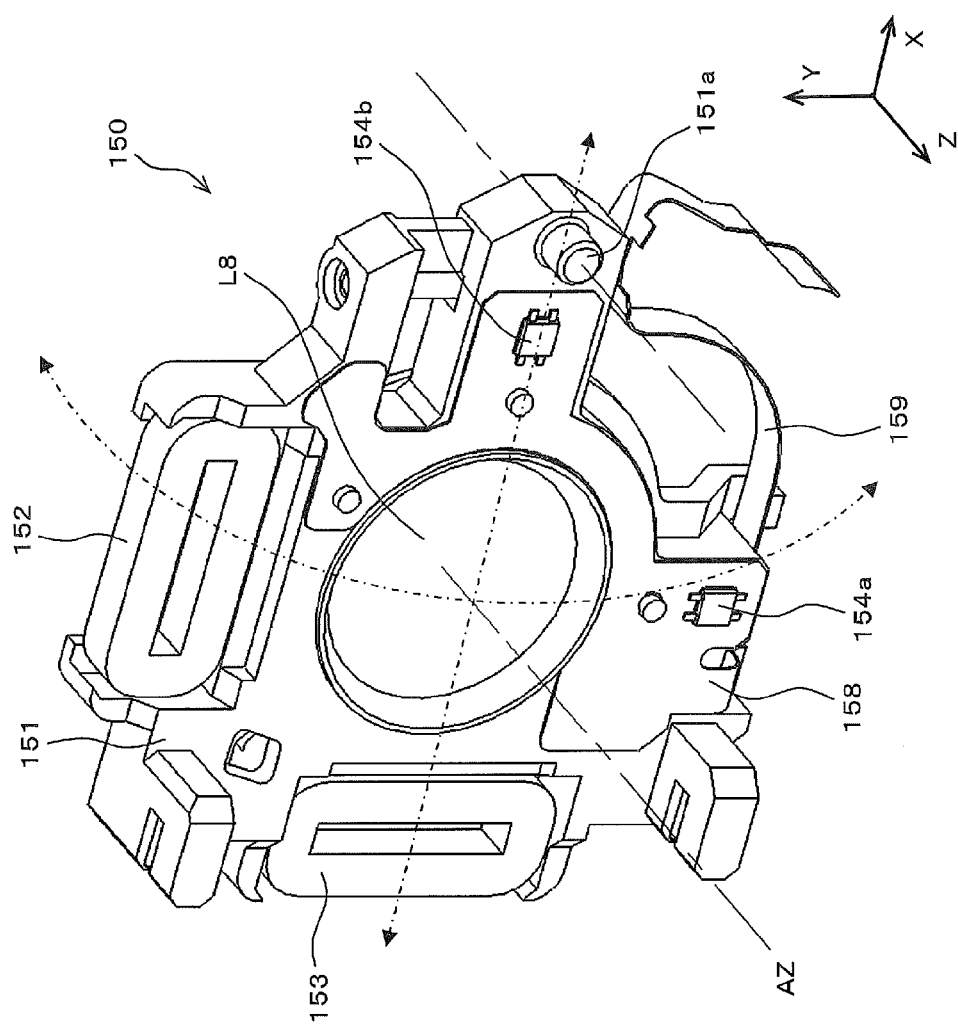
FIG. 18 is an oblique view of a blur correction unit.
Figure 19:
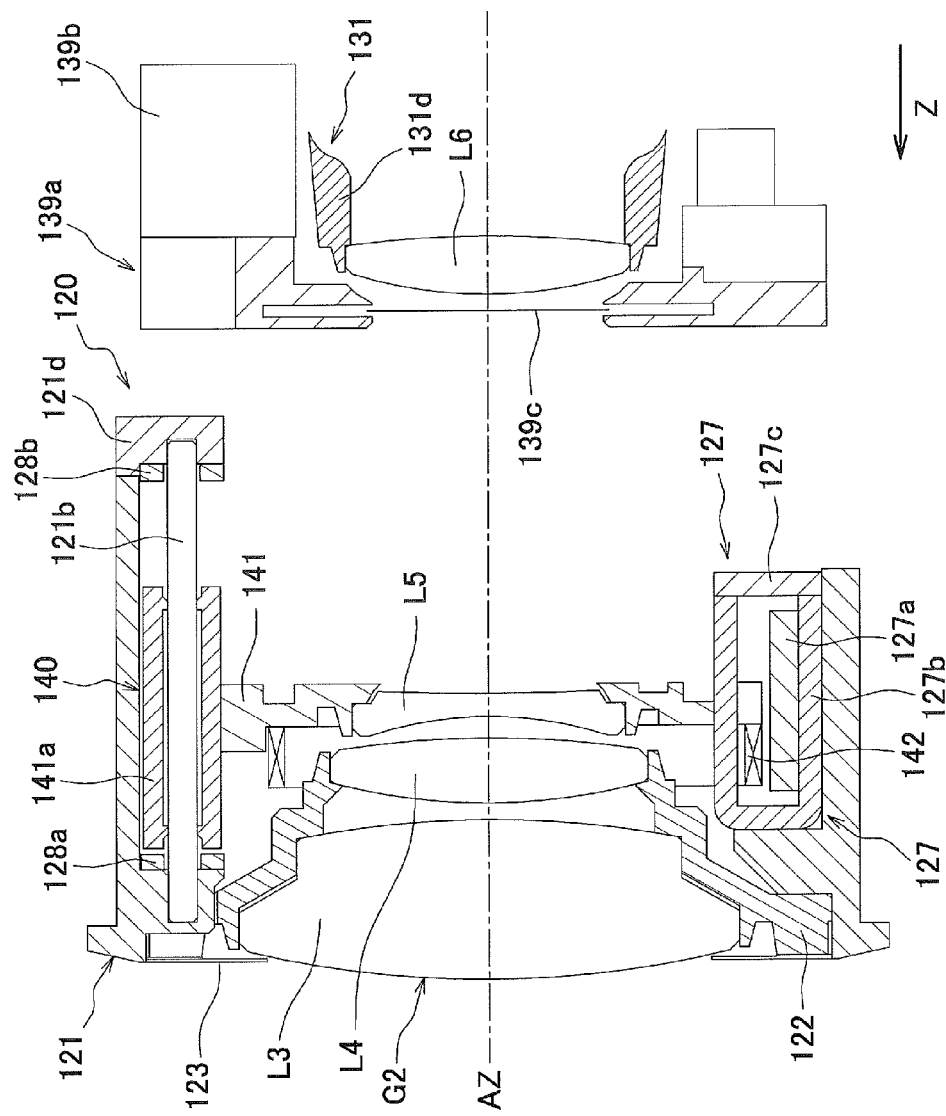
FIG. 19 is a partial cross section of the interchangeable lens unit (wide angle end)
Figure 20:
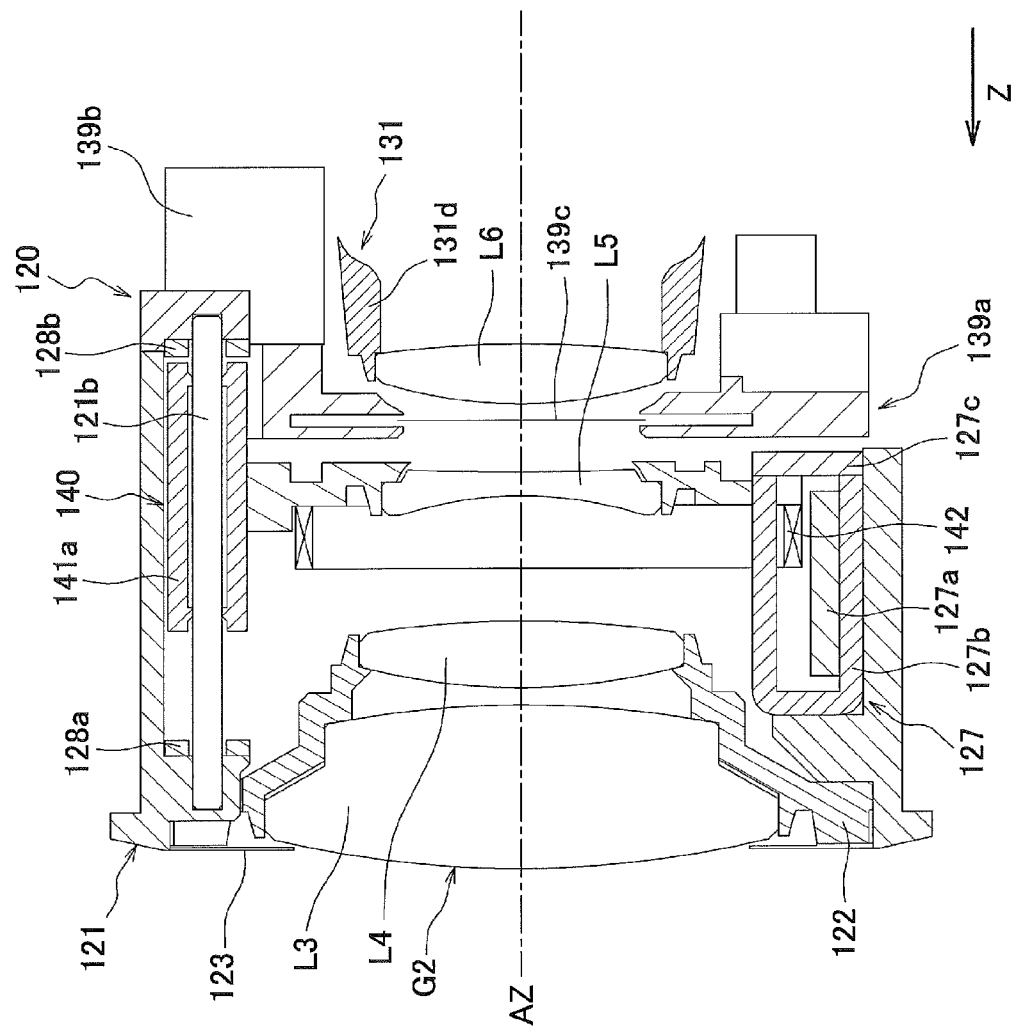
FIG. 20 is a partial cross section of the interchangeable lens unit (telephoto end).

FIG. 18 is a simplified oblique view of the correcting lens support frame 151 (different from BD of Drawings). As shown in FIG. 18, the correcting lens support frame 151 has a pin 151a. The pin 151a is inserted into a guide groove 131f in the front support frame 131 (FIG. 16). The pin 151a and the guide groove 131f allow the correcting lens support frame 151 to move in the X-axis direction (yaw direction) with respect to the front support frame 131 and allow rotation with respect to the front support frame 131 in an arc whose center is the pin 151a. Consequently, the correcting lens L8 fixed to the correcting lens support frame 151 is movable in the X-axis direction (yaw direction) and the Y-axis direction (pitch direction) with respect to the sixth lens L6, the seventh lens L7, the ninth lens L9, and the tenth lens L10.

The first correction drive unit 155 is an electromagnetic actuator for driving the correcting lens support frame 151 in the pitch direction with respect to the front support frame 131 and the rear support frame 132 and includes a first coil 152, a first correction magnet 134b, a first correction main yoke 134a, and a first correction sub-yoke 137a.

As shown in FIG. 13, the first coil 152 is fixed to the correcting lens support frame 151. The electrical substrate 158 is connected to the first coil 152. The first correction magnet 134b is arranged so as to be opposite to and facing the first coil 152 in the Z-axis direction and is fixed to the first correction main yoke 134a. The first correction main yoke 134a is fixed to the front support frame 131. The first correction sub-yoke 137a is arranged on the opposite side from the first correction magnet 134b with respect to the first coil 152. The first correction sub-yoke 137a, a sub-yoke 137, and a second correction sub-yoke 137b are integrally formed together as a one-piece unitary member. The sub-yoke 137 is fixed to the rear support frame 132.

The second correction drive unit 156 is an electromagnetic actuator for driving the correcting lens support frame 151 in the yaw direction with respect to the front support frame 131 and the rear support frame 132 and includes a second coil 153, a second correct magnet 135b, a second correction main yoke 135a, and the second correction sub-yoke 137b.

The second coil 153 is fixed to the correcting lens support frame 151. The electrical substrate 158 is connected to the second coil 153. The second correct magnet 135b is arranged so as to be opposite the second coil 153 in the Z-axis direction and is fixed to the second correction main yoke 135a. The second correction main yoke 135a is fixed to the front support frame 131. The second correction sub-yoke 137b is positioned on the opposite side from the second correct magnet 135b with respect to the second coil 153.

As shown in FIGS. 13 and 18, the first position sensor 154*a* is used for detecting the position of the correcting lens support frame 151 in the pitch direction with respect to the front support frame 131 and is, for example, a Hall effect sensor. The first position sensor 154*a* is disposed on the opposite side of the focus lens L5 from the first coil 152. The first detection magnet 155*a* fixed to the front support frame 131 is disposed at a position opposite the first position sensor 154*a*.

The second position sensor 154*b* is used for detecting the position of the correcting lens support frame 151 in the yaw direction with respect to the front support frame 131, and is, for example, a Hall effect sensor. The second position sensor 154*b* is disposed on the opposite side of the focus lens L5 from the second coil 153. The second detection magnet 155*b* fixed to the front support frame 131 is disposed at a position opposite the second position sensor 154*b*.

As best shown in FIG. 1, the blur correction microcomputer 48 controls the first correction drive unit 155 and the second correction drive unit 156 on the basis of the detection results of the first position sensor 154*a*, the second position sensor 154*b* and the detection result of a movement detection sensor (not shown). Consequently, blurring of the optical image with respect to the imaging sensor 11, which is attributable to movement of the digital camera 1, can be reduced.

Electronic blur correction, in which the blurring of an image is corrected on the basis of image data outputted from the imaging sensor 11, may be applied instead as the method for reducing blurring of the subject image. The method for reducing blurring of the optical image may also be a sensor shift method in which the imaging sensor 11 is driven in two directions perpendicular to the optical axis AZ.

(6) Lens Microcomputer

As shown in FIG. 1, the lens microcomputer 40 includes a CPU (not shown), a ROM (not shown), and a memory 40*a*, and various functions can be performed by reading programs stored in the ROM into the CPU. For instance, the lens microcomputer 40 can check whether the focus lens support frame 140 is in the starting point position by using a detection signal from the photosensor 124.

The memory 40*a* is a nonvolatile memory and can hold stored information even when no power is being supplied. The memory 40*a* contains a tracking table for realizing a zoom lens system or information related to the interchangeable lens unit 2 (lens information), for example. The lens microcomputer 40 controls the focus drive unit 160, and the focus lens support frame 140 is driven by the focus drive unit 160 in the Z-axis direction, on the basis of this tracking table. An operation in which the position of the focus lens support frame 140 is made to conform to changes in the focal distance on the basis of a tracking table will hereinafter be referred to as electronic tracking.

Positional Relation Around Focus Lens

The positional relation of the various parts disposed around the focus lens L5 will now be described.

Figure 12:
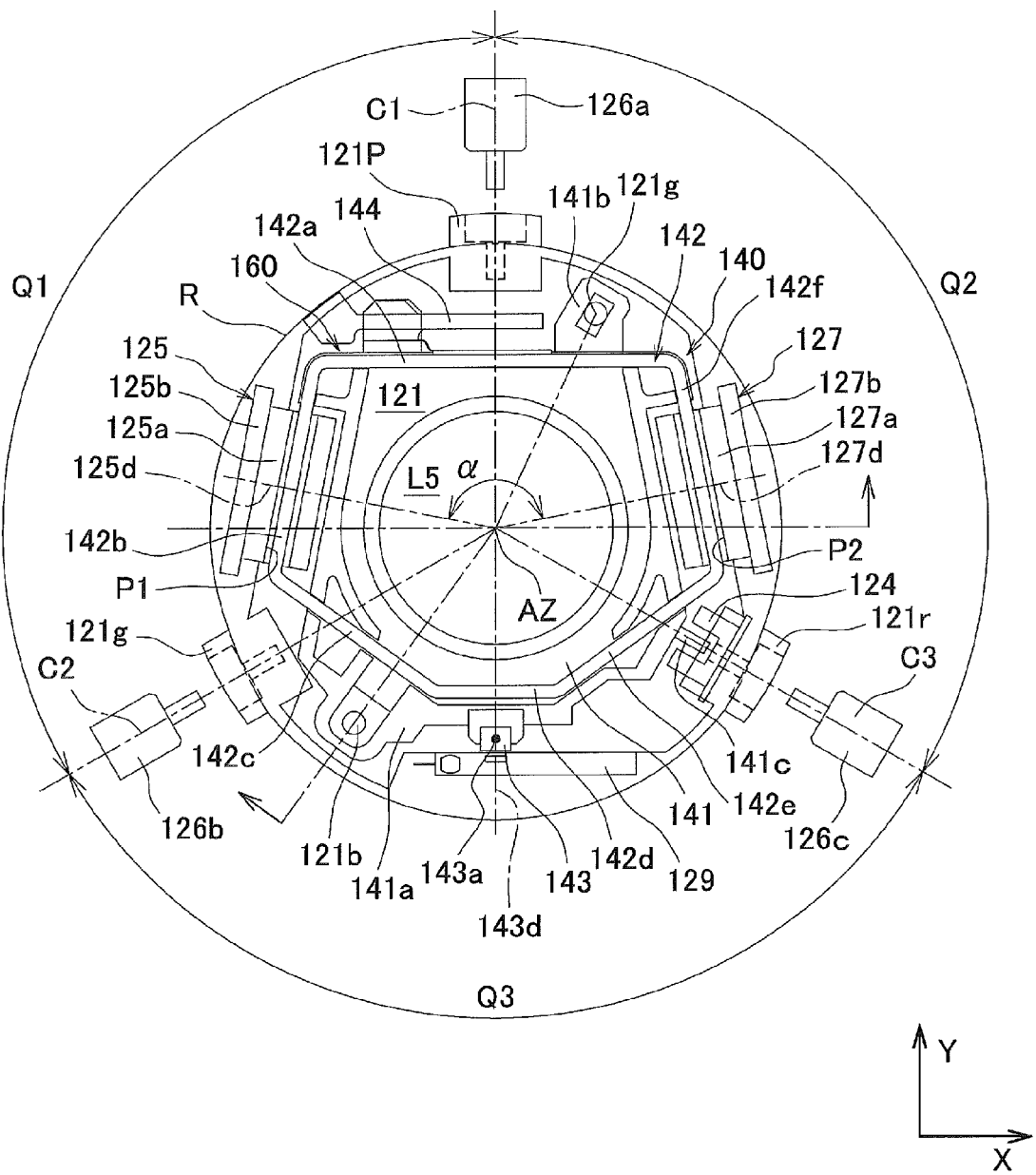
FIG. 12 is a diagram of the positional relation of the various parts around the focus lens.

FIG. 12 is a simplified plan view of the second lens group support unit 120 and the focus lens support frame 140 when viewed in the Z-axis direction.

As shown in FIG. 12, the focus drive unit 160 is disposed at a different position from that of the second cam pins 126*a* to 126*c* and/or the fixing portions 121*p* to 121*r* when viewed in the Z-axis direction. More specifically, the focus drive unit 160 is positioned within an imaginary circle R defined by the arrangement of the second cam pins 126*a* to 126*c* when looking down optical axis AZ in the Z-axis direction. Alternatively stated, the focus drive unit 160 is disposed at a position that does not overlap the positions of the second cam pins 126*a* to 126*c* and/or the fixing portions 121*p* to 121*r* when viewed down the optical axis AZ in the Z-axis direction.

As shown in FIG. 12, the first magnetic field generator 125 is disposed at a different circumferential position along the imaginary circle R from the second cam pins 126*a* to 126*c* and/or the fixing portions 121*p* to 121*r* when viewed in the Z-axis direction. More specifically, the first magnetic field generator 125 is disposed in a first area $Q_1$ formed between the adjacent second cam pins 126*a* and 126*b* and the adjacent fixing portions 121*p* and 121*q* when looking down optical axis AZ in the Z-axis direction. Alternatively stated, the first magnetic field generator 125 is disposed at a position that does not overlap the positions of the second cam pins 126*a* and 126*b* and/or the fixing portions 121*p* and 121*q* when viewed down the optical axis AZ in the Z-axis direction.

As shown in FIG. 12, the second magnetic field generator 127 is disposed at a different circumferential position from the second cam pins 126*a* to 126*c* and the fixing portions 121*p* to 121*r* when viewed in the Z-axis direction.

More precisely, the second magnetic field generator 127 is disposed in a second area $Q_2$ formed between the adjacent second cam pins 126*a* and 126*c* and the adjacent fixing portions 121*p* and 121*r* when looking down optical axis AZ in the Z-axis direction.

The sensor magnet 143 is disposed in a third area Q3 formed between the adjacent second cam pins 126*b* and 126*c* and the adjacent fixing portions 121*q* and 121*r* when viewed in the Z-axis direction.

As shown in FIG. 12, the first magnetic field generator 125 and the second magnetic field generator 127 are disposed at substantially opposing sides of the optical axis AZ. Alternatively, the first magnetic field generator 125 and the second magnetic field generator 127 are disposed symmetrically about the center axis C1 of the second cam pin 126*a*. More precisely, the first magnetic field generator 125 and the second magnetic field generator 127 are disposed so that the first center line 125*d* of the first magnetic field generator 125 forms an obtuse angle α with the second center line 127*d* of the second magnetic field generator 127.

Accordingly, the first magnetic field generator 125 and the second magnetic field generator 127 are not disposed in a state of perfectly opposing each other, and the first reference face P1 of the first magnetic field generator 125 is sloped (rather than parallel) with respect to the second reference face P2 of the second magnetic field generator 127. Therefore, when viewed in the Z-axis direction, the first magnetic field generator 125 and the second magnetic field generator 127 are disposed substantially along the outer boundary of the imaginary circle R whose center is concentric with the optical axis AZ.

The first magnetic field generator 125 and the second magnetic field generator 127 are disposed in symmetry with respect to alignment of the second cam pin 126*a* and the sensor magnet 143. The first magnetic field generator 125 and the second magnetic field generator 127 are disposed in line symmetry with respect to a reference line 143*b* that links the optical axis AZ and the center line 143*a*. Since the reference line 143*b* coincides with the center line C1 of the second cam pin 126*a*, the first magnetic field generator 125 and the second magnetic field generator 127 can be said to be disposed at positions that are symmetrical with respect to the second cam pin 126*a*.

Since the sensor magnet 143 is disposed between the second cam pins 126*b* and 126*c* in the circumferential direction, the distance from the second cam pin 126*b* to the sensor magnet 143 (more precisely, the center line 143*a*) is equal to the distance from the second cam pin 126*c* to the sensor magnet 143 (more precisely, the center line 143*a*).

Also, the first guide pole 121*b* is disposed between the sensor magnet 143 and the second cam pin 126*b* in the circumferential direction. The second guide pole 121*g* is disposed between the second magnetic field generator 127 and the second cam pin 126*a* in the circumferential direction. The second guide pole 121*g* is disposed on substantially the opposite side of the optical axis AZ from the first guide pole 121*b*.

Figure 9:
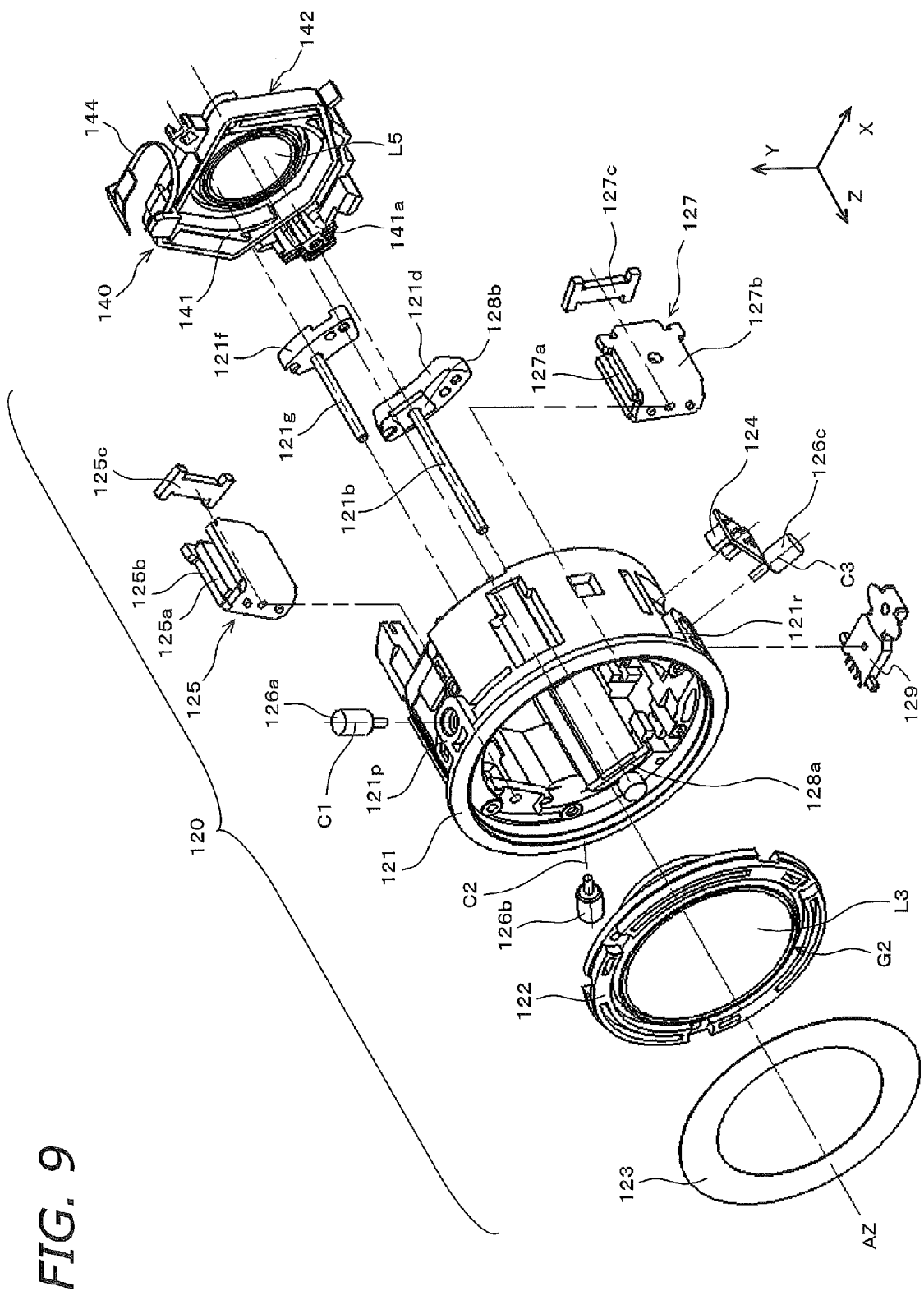
FIG. 9 is an exploded oblique view of the second lens group support unit.
Figure 10:
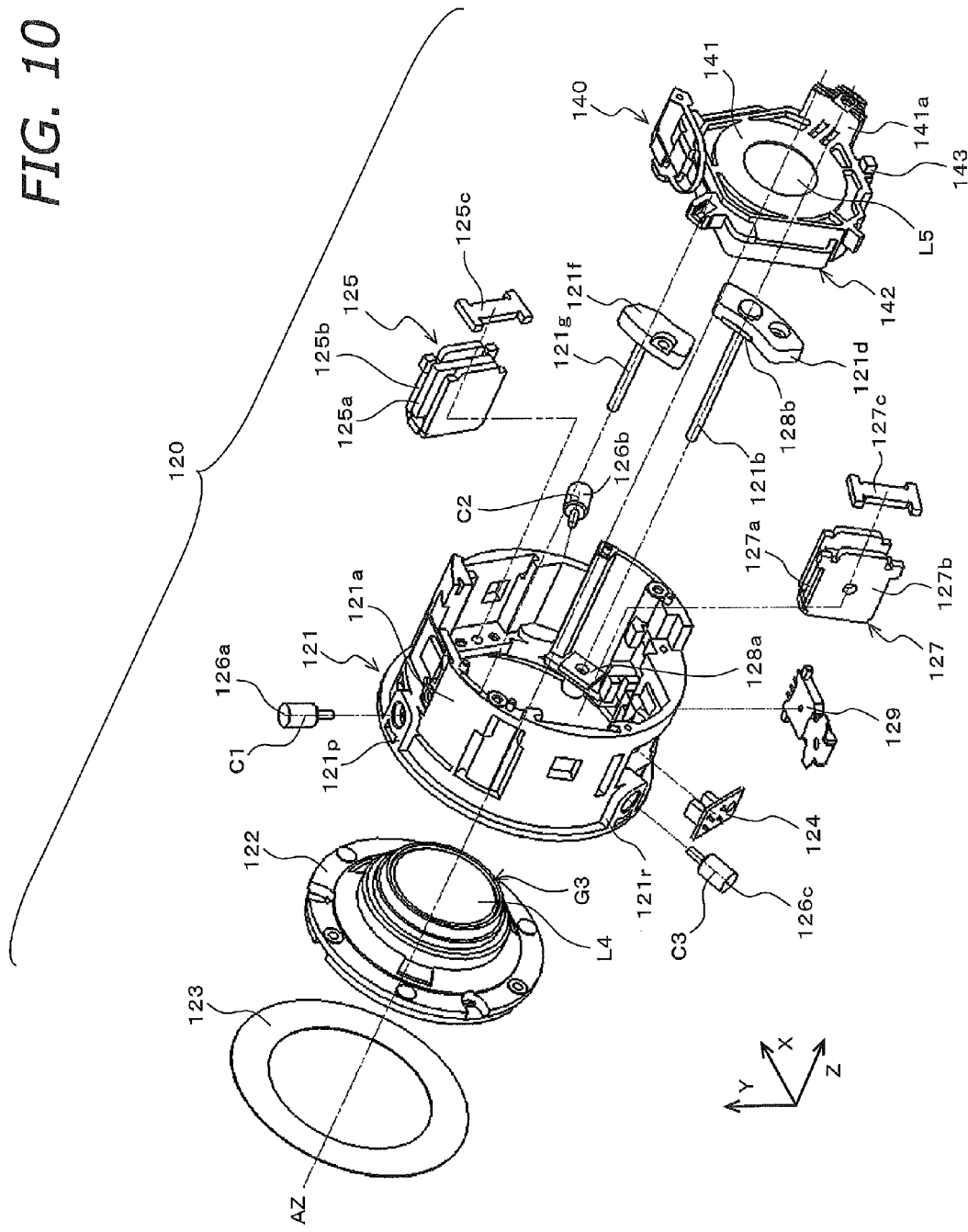
FIG. 10 is an exploded oblique view of the second lens group support unit.

The photosensor 124 is disposed at the same circumferential position as the second cam pin 126*c*. As shown in FIGS. 9 and 10, the photosensor 124 is disposed on the negative side of the second cam pin 126*c* in the Z-axis direction. The protrusion 141*c* of the support frame main body 141 is disposed on a line segment that links the optical axis AZ and the second cam pin 126*c*. This protrusion 141*c* is able to pass through the detection area of the photosensor 124 in the Z-axis direction.

The flexible printed wiring 144 is disposed between the focus lens L5 and the second cam pin 126*a* when viewed in the Z-axis direction (more precisely, between the fixing portion 121*p* and the focus lens support frame 140).

Further, the coil 142 has a hexagonal shape and includes a first portion 142*a*, a second portion 142*b*, a third portion 142*c*, a fourth portion 142*d*, a fifth portion 142*e*, and a sixth portion 142*f*. The first to sixth portions 142*a* to 142*f* have a linear shape.

The first portion 142*a* is disposed on the second cam pin 126*a* side of the fourth lens focus lens L5 and is perpendicular to the reference line 143*b*. The second portion 142*b* is disposed between the first magnet 125*a* and the first main yoke 125*b* and is disposed so as to be opposite the first magnet 125*a* and the first main yoke 125*b*. The second portion 142*b* is perpendicular to the first center line 125*d*.

The third portion 142*c* is disposed between the focus lens L5 and the second cam pin 126*b* and is disposed between the first guide pole 121*b* and the focus lens L5. The fourth portion 142*d* is disposed between the focus lens L5 and the sensor magnet 143. The fifth portion 142*e* is disposed between the focus lens L5 and the second cam pin 126*c*.

The sixth portion 142*f* is disposed between the second magnet 127*a* and the second main yoke 127*b* and is disposed so as to be opposite the second magnet 127*a* and the second main yoke 127*b*. The sixth portion 142*f* is perpendicular to the second center line 127*d*.

Since the coil 142 is formed in line symmetry with respect to the reference line 143*b*, the second portion 142*b* and the sixth portion 142*f* are disposed in line symmetry with respect to the reference line 143*b*, and the third portion 142*c* and the fifth portion 142*e* are disposed in line symmetry with respect to the reference line 143*b*.

OPERATION OF THE DIGITAL CAMERA

The operation of the digital camera 1 will now be described.

(1) Imaging Mode

This digital camera 1 has two imaging modes. More specifically, the digital camera 1 has a viewfinder imaging mode in which the user looks at the subject through the viewfinder eyepiece window 9 and a monitor imaging mode in which the user looks at the subject on the display unit 20.

In viewfinder imaging mode, for example, an image display controller 21 drives the display unit 20. As a result, an image of the subject acquired by the imaging sensor 11 (a so-called through-image) is displayed on the liquid crystal viewfinder 8.

In monitor imaging mode, for example, the display unit 20 is driven by the image display controller 21 and a real-time image of the subject is displayed on the display unit 20. The imaging mode selector button 34 allows switching between these two imaging modes.

(2) Zoom Operation

Next, the operation of the interchangeable lens unit 2 will be described for when the user performs a zoom operation.

For example, if the user turns the zoom ring 84 to the telephoto side from the wide angle end state shown in FIG. 5, the first rotary frame 58 and the second rotary frame 56 rotate along with the zoom ring 84 with respect to the first fixing frame 61 and the second fixing frame 62. When the first rotary frame 58 rotates with respect to the first fixing frame 61, the first rotary frame 58 is guided by a third cam groove (not shown) and the cam pin (not shown) of the second fixing frame 62; and as a result, the first rotary frame 58 moves to the positive side in the Z-axis direction with respect to the first fixing frame 61 and the second fixing frame 62. Here, the cam pin 58*c* of the first rotary frame 58 moves through the through-groove 61*a* of the first fixing frame 61. As such, the cam pin 58*c* does not interfere with the first fixing frame 61.

When the first rotary frame 58 rotates with respect to the second fixing frame 62, the third cam pins 136 are guided by the second cam grooves 58*b*, so the third lens group support unit 130 moves to the positive side in the Z-axis direction with respect to the first rotary frame 58, as shown in FIGS. 5, 6, 19, and 20. The distance that the third lens group support unit 130 moves here with respect to the first fixing frame 61 is the sum of the distance that the third lens group support unit 130 moves to the Z-axis direction positive side with respect to the first rotary frame 58 and the distance that the first rotary frame 58 moves to the Z-axis direction positive side with respect to the first fixing frame 61. When the third lens group support unit 130 moves in the Z-axis direction with respect to the first fixing frame 61, rotation of the third lens group support unit 130 with respect to the second fixing frame 62 is limited by the linear grooves 62*a*.

When the third lens group support unit 130 moves to the Z-axis direction positive side with respect to the first fixing frame 61, the cosmetic frame 55 and the linear frame 57 also move integrally to the Z-axis direction positive side. Also, since the second rotary frame 56 is arranged to be movable integrally in the Z-axis direction and to rotatable with respect to the linear frame 57, the second rotary frame 56 moves integrally in the Z-axis direction along with the third lens group support unit 130.

When the first rotary frame 58 rotates with respect to the linear frame 57, the second cam pins 126*a* to 126*c* are guided by the first cam grooves 58*a*, and the second lens group support unit 120 moves to the Z-axis direction positive side with respect to the first rotary frame 58, as shown in FIGS. 5 and 6. The distance that the second lens group support unit 120 moves here in the Z-axis direction with respect to the first fixing frame 61 is the sum of the distance that the second lens group support unit 120 moves to the Z-axis direction positive side with respect to the first rotary frame 58 and the distance that the first rotary frame 58 moves to the Z-axis direction positive side with respect to the first fixing frame 61. When the second lens group support unit 120 moves in the Z-axis direction with respect to the first fixing frame 61, the rotation of the second lens group support unit 120 with respect to the first fixing frame 61 is limited by the second linear grooves 57*b*.

Further, when the second rotary frame 56 rotates with respect to the linear frame 57, the first cam pins 54*a* are guided by the cam grooves 56*a*. As such, the first lens group support unit 110 moves to the Z-axis direction positive side with respect to the second rotary frame 56.

Meanwhile, as discussed above, since the linear frame 57 and the second rotary frame 56 move in the Z-axis direction along with the third lens group support unit 130, the distance that the first lens group support unit 110 moves to the Z-axis direction positive side with respect to the first fixing frame 61 is the sum of the distance that the first lens group support unit 110 moves to the Z-axis direction positive side with respect to the second rotary frame 56 and the distance that the second rotary frame 56 moves to the Z-axis direction positive side with respect to the first fixing frame 61 (that is, the distance that the third lens group support unit 130 moves in the Z-axis direction with respect to the first fixing frame 61). When the first lens group support unit 110 moves in the Z-axis direction with respect to the first fixing frame 61, the rotation of the first lens group support unit 110 with respect to the first fixing frame 61 is limited by the first linear grooves 57a.

When the zoom ring 84 is turned to the telephoto end, the state of the interchangeable lens unit 2 changes to the telephoto end state shown in FIG. 6. When the zoom ring 84 is turned to the wide angle side, the components operate in the opposite direction from that given above, and the state of the interchangeable lens unit 2 returns to the wide angle end state shown in FIG. 5.

Thus, the state of the interchangeable lens unit 2 can be changed from the wide angle end state shown in FIG. 5 to the telephoto end state shown in FIG. 6 by turning the zoom ring 84. Therefore, an image of the subject can be captured at the desired focal distance by adjusting the rotational position of the zoom ring 84.

When the focal distance changes, the second lens group support unit 120 is mechanically driven in the Z-axis direction by the turning operation of the zoom ring 84, but the focus lens support frame 140 is electrically driven and controlled by the focus adjusting unit 72 on the basis of a tracking table stored ahead of time in the memory 40a so that the subject distance is kept substantially constant. For example, when the subject distance is set to infinity, the optical image formed by the optical system L will be substantially maintained in a focused state even when the state of the interchangeable lens unit 2 is changed from the wide angle end to the telephoto end, or from the telephoto end to the wide angle end, by controlling the focus drive unit 160 and driving the focus lens support frame 140.

(3) Focus Operation

Next, the focus operation of the digital camera 1 will be described. The digital camera 1 has two focus modes: an auto-focus imaging mode and a manual focus imaging mode. The user operating the digital camera 1 can select the focus mode by pressing a focus imaging mode setting button (not shown) provided to the camera body 3.

In auto-focus imaging mode, auto-focusing is performed using a contrast detection method. When auto-focusing is performed by contrast detection method, the body microcomputer 10 requests contrast AF data from the lens microcomputer 40. This contrast AF data is data required for auto-focusing by contrast detection method, and includes, for example, the focus drive speed, focal shift amount, zoom ratio, information about whether contrast AF is possible, and so forth.

The body microcomputer 10 monitors whether or not the release button 30 has been pressed half-way down. If the release button 30 has been pressed half-way down, the body microcomputer 10 sends the lens microcomputer 40 an auto-focus start command. The auto-focus start command is a directive to start auto-focusing by contrast detection method.

Upon receipt of this command, the lens microcomputer 40 controls the drive of the focus drive unit 160, which is a focus actuator. More precisely, the lens microcomputer 40 sends a control signal to the focus drive controller 41. The focus drive unit 160 is driven by the focus drive controller 41, and the focus lens support frame 140 is moved slightly, on the basis of this control signal.

The body microcomputer 10 calculates an evaluation value for use in auto-focusing (hereinafter referred to as an AF evaluation value) on the basis of the received image data. More specifically, the body microcomputer 10 sends a command to the digital signal processor 15. The digital signal processor 15 sends an image signal to the body microcomputer 10 at a specific timing on the basis of the received command. The body microcomputer 10 finds a brightness signal from the image data produced by the imaging sensor 11, and finds the AF evaluation value by integrating the high-frequency part within the screen of the brightness signal. The AF evaluation value thus calculated is stored in a DRAM (not shown) in a state of being associated with the exposure synchronization signal. Since the lens position information acquired by the body microcomputer 10 from the lens microcomputer 40 is also associated with the exposure synchronization signal, the body microcomputer 10 can store the AF evaluation value with it associated with the lens position information.

Next, the body microcomputer 10 extracts as the focal point the position of the focus lens support frame 140 where the AF evaluation value is at its maximum, on the basis of the AF evaluation value stored in the DRAM. The method for driving the focus lens support frame 140 in the extraction of the focal point is generally known as a hill climbing method. With a hill climbing method, the focus lens support frame 140 is moved in the direction of increasing the AF evaluation value, and the AF evaluation value is found for each position of the focus lens support frame 140. This operation is continued until the maximum value for the AF evaluation value is detected, that is, until the AF evaluation value increases up to its peak and then begins to decrease.

The body microcomputer 10 sends a control signal to the focus drive controller 41 via the lens microcomputer 40 so that the focus lens support frame 140 will be driven to the position corresponding to the extracted focal point. The focus drive controller 41 produces a drive pulse for driving the focus drive unit 160 on the basis of a control signal from the body microcomputer 10 (or the lens microcomputer 40), for example. The focus drive unit 160 is driven by an amount corresponding to this drive signal, and the focus lens support frame 140 moves in the Z-axis direction to the position corresponding to the focal point.

Focusing in auto-focus imaging mode is performed in this way with the digital camera 1. The above operation is executed instantly when the user presses the shutter button 30 half-way down.

Focusing by contrast detection method can also be carried out in monitor imaging mode (known as live view mode), in which real-time image data can be produced with the imaging sensor 11. The reason for this is that in viewfinder mode, image data is produced in a steady state by the imaging sensor 11, and auto-focusing by contrast detection method using this image data is easy.

In live view mode, since a real-time image of the subject is displayed on the display unit 20, the user can decide on the composition for capturing the still picture or moving picture while looking at the display unit 20. Also, there is another imaging mode the user can select in addition to live view mode using the display unit 20, which is a second live view mode (viewfinder imaging mode) in which the subject image from the interchangeable lens unit 2 is guided to the liquid crystal viewfinder 8 (viewfinder unit 38).

The manual focus imaging mode will now be described.

In manual focus imaging mode, the subject distance can be adjusted manually by operating the focus ring 89. More specifically, when the user turns the focus ring 89, the focus ring angle detector 90 detects the rotational angle of the focus ring 89 and outputs a signal corresponding to this rotational angle. The focus drive controller 41 is able to receive signals from the focus ring angle detector 90, and sends the detection signal of the focus ring angle detector 90 to the lens microcomputer 40.

The lens microcomputer 40 calculates the target position of the focus lens support frame 140 from the detection result of the focus ring angle detector 90, and sends a control signal to the focus drive controller 41 on the basis of this target position and the current position of the focus lens support frame 140. This control signal indicates the direction in which the focus lens support frame 140 is driven, and the size of the drive force produced by the focus drive unit 160.

Here, the current position of the focus lens support frame 140 with respect to the second lens group support unit 120 is calculated by the MR sensor 129 and the photosensor 124. More specifically, using the position where the protrusion 141c of the focus lens support frame 140 was detected by the photosensor 124 as a reference, the movement distance detected by the MR sensor 129 is monitored, and the current position of the focus lens support frame 140 with respect to the second lens group support unit 120 is calculated.

The focus drive controller 41 drives the focus drive unit 160 on the basis of the control signal from the lens microcomputer 40. More precisely, the focus drive controller 41 applies a voltage corresponding to the control signal from the lens microcomputer 40 to the coil 142 of the focus drive unit 160. When current is sent to the coil 142 of the focus drive unit 160, an electromagnetic force in the Z-axis direction acts on the coil 142 due to the magnetic field produced by the first magnetic field generator 125 and the second magnetic field generator 127. This electromagnetic force causes the focus lens support frame 140 to move along with the coil 142 in the Z-axis direction with respect to the second lens group support unit 120.

If the detection result of the focus ring angle detector 90 coincides with the current position of the focus lens support frame 140 within a specific range, the drive of the focus lens support frame 140 by the focus adjusting unit 72 is stopped, and the focus lens support frame 140 is supported in the Z-axis direction by the focus adjusting unit 72.

As discussed above, the user can perform focusing by turning the focus ring 89 while checking the subject on the display unit 20. In manual focus imagine mode, if the user presses the release button 30 all the way down, imaging is performed in a state in which the focus lens support frame 140 is stopped at an adjusted position.

(4) Still Picture Imaging

When the user presses the shutter button 30 all the way down, a command is sent from the body microcomputer 10 to the lens microcomputer 40 so that the aperture value of the optical system L will be set to the aperture value calculated on the basis of the light measurement output of the imaging sensor 11. The aperture drive controller 42 is controlled by the lens microcomputer 40, and the aperture mechanism 139a is stopped down to the indicated aperture value. Simultaneously with the indication of the aperture value, a drive command is sent from the imaging sensor drive controller 12 to the imaging sensor 11, and a shutter unit 33 drive command is sent out.

The imaging sensor 11 is exposed by the shutter unit 33 for a length of time corresponding to the shutter speed calculated on the basis of the light measurement output of the imaging sensor 11.

The body microcomputer 10 executes imaging processing and, when the imaging is completed, sends a control signal to the image recording controller 19. The image recorder 18 records an image signal to an internal memory and/or removable memory on the basis of the command of the image recording controller 19. The image recorder 18 records imaging mode information (information indicating whether autofocus imaging mode or manual focus imaging mode) along with the image signal to the internal memory and/or removable memory on the basis of the command of the image recording controller 19.

Upon completion of the exposure, the imaging sensor drive controller 12 reads image data from the imaging sensor 11, and after specific image processing, image data is outputted via the body microcomputer 10 to the image display controller 21. Consequently, the captured image is displayed on the display unit 20.

Also, upon completion of the exposure, the shutter unit 33 is reset to its initial position by the body microcomputer 10. The body microcomputer 10 issues a command to the lens microcomputer 40 for the aperture drive controller 42 to reset the aperture mechanism 139a to its open position, and a reset command is sent from the lens microcomputer 40 to the various units. Upon completion of this resetting, the lens microcomputer 40 tells the body microcomputer 10 that resetting is complete. After the resetting completion information has been received from the lens microcomputer 40, and after a series of post-exposure processing has been completed, the body microcomputer 10 confirms that the shutter button 30 has not been pressed, and the imaging sequence is concluded.

(5) Moving Picture Imaging

The digital camera 1 also has the function of capturing moving pictures. In moving picture imaging mode, image data is produced by the imaging sensor 11 at a specific period, and the image data thus produced is utilized to continuously carry out auto-focusing by contrast detection method (so-called wobbling). Since the focus drive unit 160 makes use of electromagnetic force, when wobbling is performed, a relatively large drive force can be obtained, and the focus lens support frame 140 can be driven quickly with respect to the second lens group support unit 120.

In moving picture imaging mode, if the shutter button 30 is pressed, or if the moving picture imaging button 24 is pressed, a moving picture is recorded to the image recorder 18, and when the shutter button 30 or the moving picture imaging button 24 is pressed again, recording of the moving picture by the image recorder 18 is stopped.

FEATURES OF THE DIGITAL CAMERA

The features of the digital camera 1 described above are complied below.

(1) As shown in FIG. 12, since the focus drive unit 160 is disposed at a different position from the plurality of second cam pins 126a to 126c when viewed in the Z-axis direction, the space around the second cam pins 126a to 126c can be effectively utilized.

More precisely, since the focus drive unit 160 is disposed at a different position from the fixing portions 121p to 121r when viewed in the Z-axis direction, the space around the second cam pins 126a to 126c and the fixing portions 121p to 121r can be effectively utilized.

With this constitution, the focus drive unit 160 does not make the interchangeable lens unit 2 that much larger, thereby reducing or keeping the weight of the digital camera low.

In particular, the first magnet 125a and the second magnet 127a, which need a relatively large space in the focus drive unit 160, are disposed at different circumferential positions from the second cam pins 126a to 126c. Further, the first magnet 125a and the second magnet 127a are disposed at different circumferential positions from the fixing portions 121p to 121r. Therefore, the space around the second cam pins 126a to 126c and the space around the fixing portions 121p to 121r can be utilized more effectively, which helps reduce the size and weight of the interchangeable lens unit 2.

(2) Since the focus drive unit 160 includes the coil 142, the first magnet 125a, and the second magnet 127a, a larger drive force can be obtained by increasing the number of windings of the coil 142. As a result, the drive speed of the focus lens support frame 140 can be easily increased. By employing a constitution such as this allows the focusing speed to be increased so as to capture both still and moving pictures.

Also, since the drive force is transmitted to the focus lens support frame 140 in a non-contact fashion by the coil 142, the first magnet 125a, and the second magnet 127a, noise can be suppressed during driving of the focus lens support frame 140. This means that a relatively small lens barrel can be obtained that is suited to moving picture imaging in which audio is recorded.

(3) As shown in FIG. 12, the coil 142 is disposed so as to surround the focus lens L5 when viewed in the Z-axis direction, and the coil 142 has a polygonal shape with at least five or more apexes. As a result, the coil 142 has a shape that is relatively similar to a circle whose center is concentric with the optical axis AZ. Consequently, the coil 142 can be disposed more efficiently with respect to the second holder 121 that is substantially cylindrical in shape.

Also, if the coil 142 is disposed as above, the coil 142 will keep the center of gravity of a moving body having the focus lens L5 and the focus lens support frame 140 from deviating greatly from the center of the focus lens L5, and the focus lens L5 can be easily driven more stably.

Figure 7:
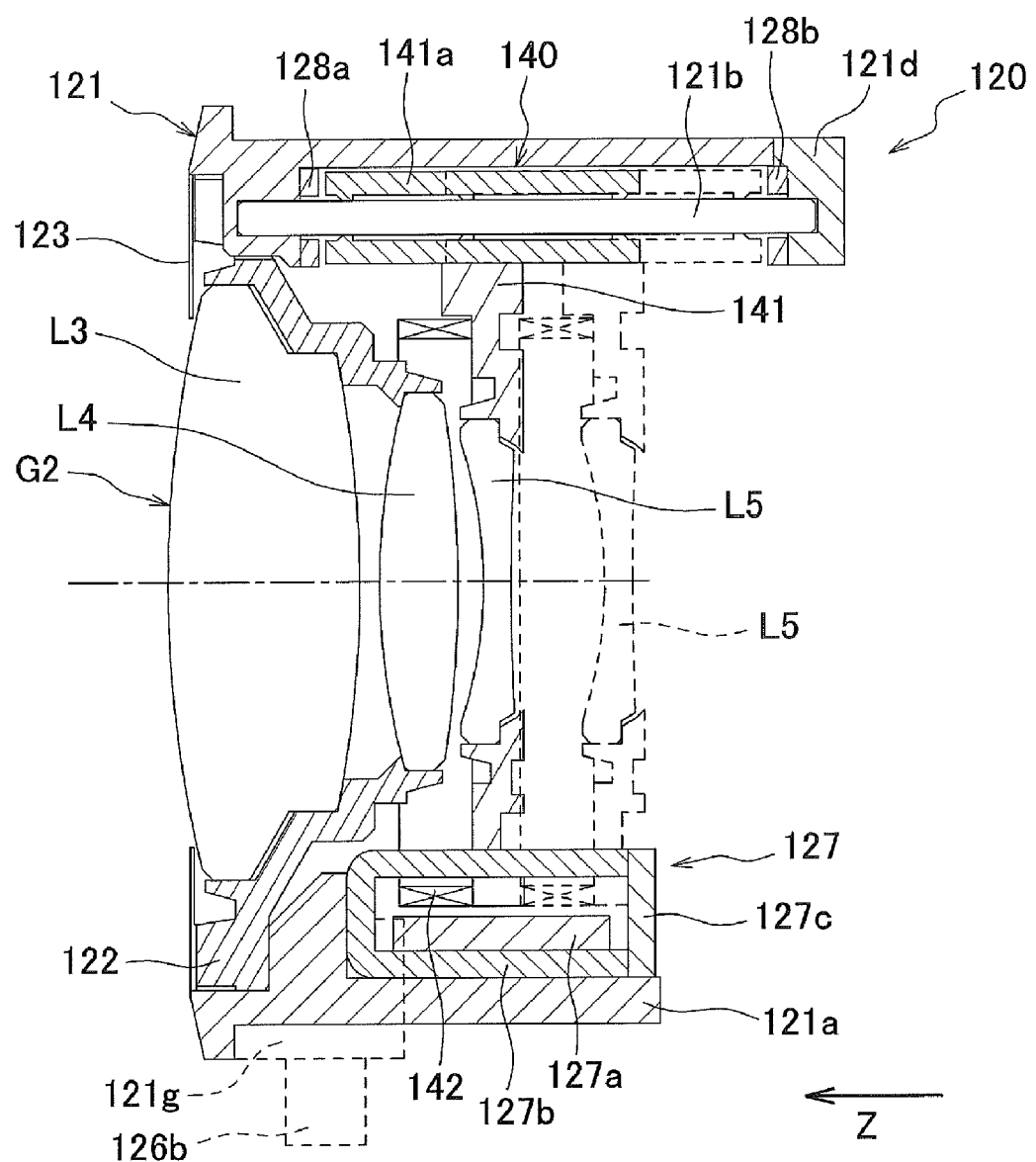
FIG. 7 is a simplified cross section of a second lens group support unit.
Figures 8A, 8B:
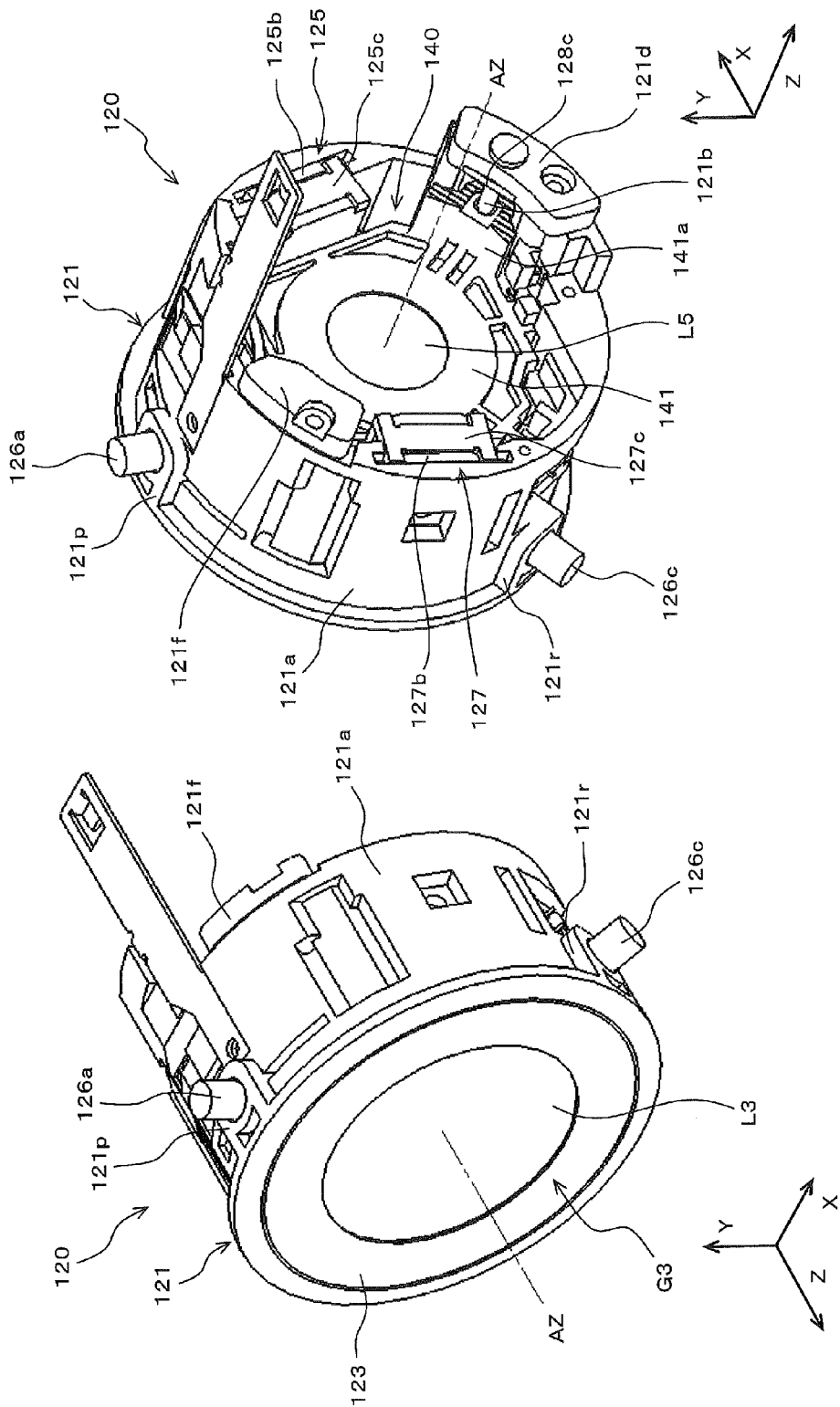
FIG. 8A is an re oblique view of the front of the second lens group support unit.
FIG. 8B is an re oblique view of the rear of the second lens group support unit.

(4) As shown in FIG. 7, since the coil 142 can move within the space on the outer peripheral side of the fourth lens L4, the space on the outer peripheral side of the fourth lens L4 can be effectively utilized. Consequently, the drive force of the focus drive unit 160 can be kept high while the size of the interchangeable lens unit 2 is kept small in the Z-axis direction.

(5) As shown in FIG. 12, the first magnet 125a and the second magnet 127a are disposed along the imaginary circle R whose center is concentric with the optical axis AZ. More precisely, the first magnet 125a and the second magnet 127a are disposed so that the first center line 125d forms an obtuse angle α with the second center line 127d when viewed in the Z-axis direction. Accordingly, the focus drive unit 160 can be disposed more efficiently around the optical axis AZ, and the size of the interchangeable lens unit 2 can be kept small.

(6) As shown in FIG. 12, since the first magnet 125a and the second magnet 127a are disposed in line symmetry with respect to the center line C1 of the second cam pin 126a, the first magnet 125a and the second magnet 127a can be disposed more efficiently around the second cam pins 126a to 126c.

(7) As shown in FIG. 12, since the first magnet 125a and the second magnet 127a are disposed in symmetry with respect to the sensor magnet 143 when viewed in the Z-axis direction, the effects of the magnetic fields generated by the first magnet 125a and the second magnet 127a on the accuracy of the MR sensor 129 are cancelled out. As a result, the size of the interchangeable lens unit 2 can be kept small while improving the detection accuracy of the MR sensor 129.

(8) As shown in FIG. 12, since the first magnet 125a is disposed in the first area Q1 and the second magnet 127a is disposed in a second area Q2, the first magnet 125a and the second magnet 127a can be disposed more efficiently around the second cam pin 126a.

(9) Since the digital camera 1 is thus equipped with the interchangeable lens unit 2, an increase in the size and weight of the digital camera can be avoided.

(10) Also, as shown in FIG. 13, since the correcting lens L8 is disposed between the seventh lens L7 and the ninth lens L9, a relatively large space must be ensured between the seventh lens L7 and the ninth lens L9.

However, if a space is ensured between lenses that move integrally as with the above constitution, position deviation tends to occur between these lenses, and this makes it difficult to align the optical axes of the lenses at the specified precision.

In view of this, with the above-mentioned digital camera 1, positioning of the rear support frame main body 132c in the radial direction (a direction perpendicular to the optical axis AZ; an example of the second direction) with respect to the front support frame main body 131c is performed by the first positioning portion 131g and the second positioning portion 132g. With this constitution, a space S can be ensured between the seventh lens L7 and the ninth lens L9, it is easy to position the front support frame 131 and the rear support frame 132, and the optical axis of the ninth lens L9 can be accurately aligned with the optical axis of the seventh lens L7.

Also, the optical axes of the ninth lens L9 and the tenth lens L10 fixed to the rear support frame 132 can be accurately aligned with the optical axes of the sixth lens L6 and the seventh lens L7 fixed to the front support frame 131. Consequently, the optical accuracy of the optical system L can be maintained or improved.

Also, the first positioning portion 131g has the front protrusion 131a protruding in the first direction from the outer peripheral part of the front support frame main body 131c, and the front contact portions 131b protruding in the first direction from the front protrusion 131a. The second positioning portion 132g has the rear protrusion 132a that extends from the outer peripheral part of the rear support frame main body 132c to the front support frame 131 side in the first direction, and the rear contact portion 132b that protrudes to the front support frame 131 side in the first direction from the rear protrusion 132a and comes into contact with the front contact portions 131b along a circumference whose center is concentric with the optical axis AZ. Therefore, the front support frame 131 and the rear support frame 132 can be positioned with a simple configuration.

(11) As shown in FIG. 13, the first positioning portion 131g protrudes from the outer peripheral part of the front support frame main body 131c and the second positioning portion 132g protrudes from the outer peripheral part of the rear support frame main body 132c. As such, the space S is formed between the front support frame main body 131c and the rear support frame main body 132c. Greater design latitude is afforded because other optical elements (for example, in this embodiment, the blur correction unit 150 and the correcting lens L8) can be disposed in this space S.

(12) Since the front protrusion 131a and the rear protrusion 132a are substantially annular, the strength of the first positioning portion and second positioning portion can be increased. As a result, this raises the overall strength of the third lens group support unit 130 formed by the front support frame 131 and the rear support frame 132.

(13) Since the first outer peripheral face 131k is disposed at the same radial position as the outer peripheral face 132m of the rear contact portions 132b (or more precisely, the second outer peripheral face 132k of the rear protrusion 132a), this prevents the third lens group support unit 130 from being larger than necessary.

OTHER EXAMPLE EMBODIMENTS

Embodiments of the present invention are not limited to those discussed above, and various changes and modifications are possible without departing from the gist of the present invention. Also, the above embodiments are basically just favorable examples, and are not intended to limit the present invention, its applications, or the scope of these applications.

(a) In the above embodiments, the digital camera was capable of capturing both moving and still pictures, but may instead be capable of capturing just still pictures or just moving pictures.

(b) In the above embodiments, the digital camera may be, for example, a digital still camera, a digital video camera, a mobile telephone equipped with a camera or a PDA equipped with a camera.

(c) The above-mentioned digital camera 1 did not have a quick return mirror, but a quick return mirror may be installed in the digital camera 1 as in a conventional single reflex lens camera.

(d) The configuration of the optical system L is not limited to that in the embodiments. For example, the focus lens L5 may consist of a plurality of lenses, and the first lens group G1 may consist of just a single lens.

Also, the second lens group G2 (the third lens L3 and fourth lens L4) was installed in the second lens group support unit 120, but no lenses need be installed in the second lens group support unit 120.

(e) In the above embodiments, the exposure time to the imaging sensor 11 was controlled by operating the shutter unit 33, but the exposure time of the imaging sensor 11 may instead be controlled by an electronic shutter.

(f) In the above embodiments, the electronic tracking was performed by the lens microcomputer 40, but a command may be sent from the body microcomputer 10 to the lens microcomputer 40 and the control of the electronic tracking performed on the basis of this command.

(g) In the above embodiments, an example was described in which the focus drive unit 160 was an electromagnetic actuator constituted by the coil 142, the first magnetic field generator 125, and the second magnetic field generator 127, but the focus drive unit 160 may instead be a motor or some other actuator.

(h) In the above embodiments, the first center line 125d of the first magnet 125a forms an obtuse angle α with the second center line 127d of the second magnet 127a, but the same effect will be obtained if this angle is an acute angle.

(i) In the above embodiments, the coil 142 has a hexagonal shape but the coil 142 may have a polygonal shape with at least five apexes.

(j) In the above embodiments, the first magnetic field generator 125 and the second magnetic field generator 127 are rectangular members, and the first reference face P1 and the second reference face P2 are planar surfaces. However, the first magnetic field generator 125 and the second magnetic field generator 127 may be arc-shaped members that follow along the imaginary circle R. In this case, since the first reference face P1 is a curved face whose center is concentric with the optical axis AZ, an imaginary line that passes through the center of the first reference face P1 and that is perpendicular to the first reference face P1 near the center becomes a first center line 125d. Also, since the second reference face P2 is a curved face whose center is concentric with the optical axis AZ, an imaginary line that passes through the center of the second reference face P2 and that is perpendicular to the second reference face P2 near the center becomes a second center line 127d.

Figures 14A, 14B:
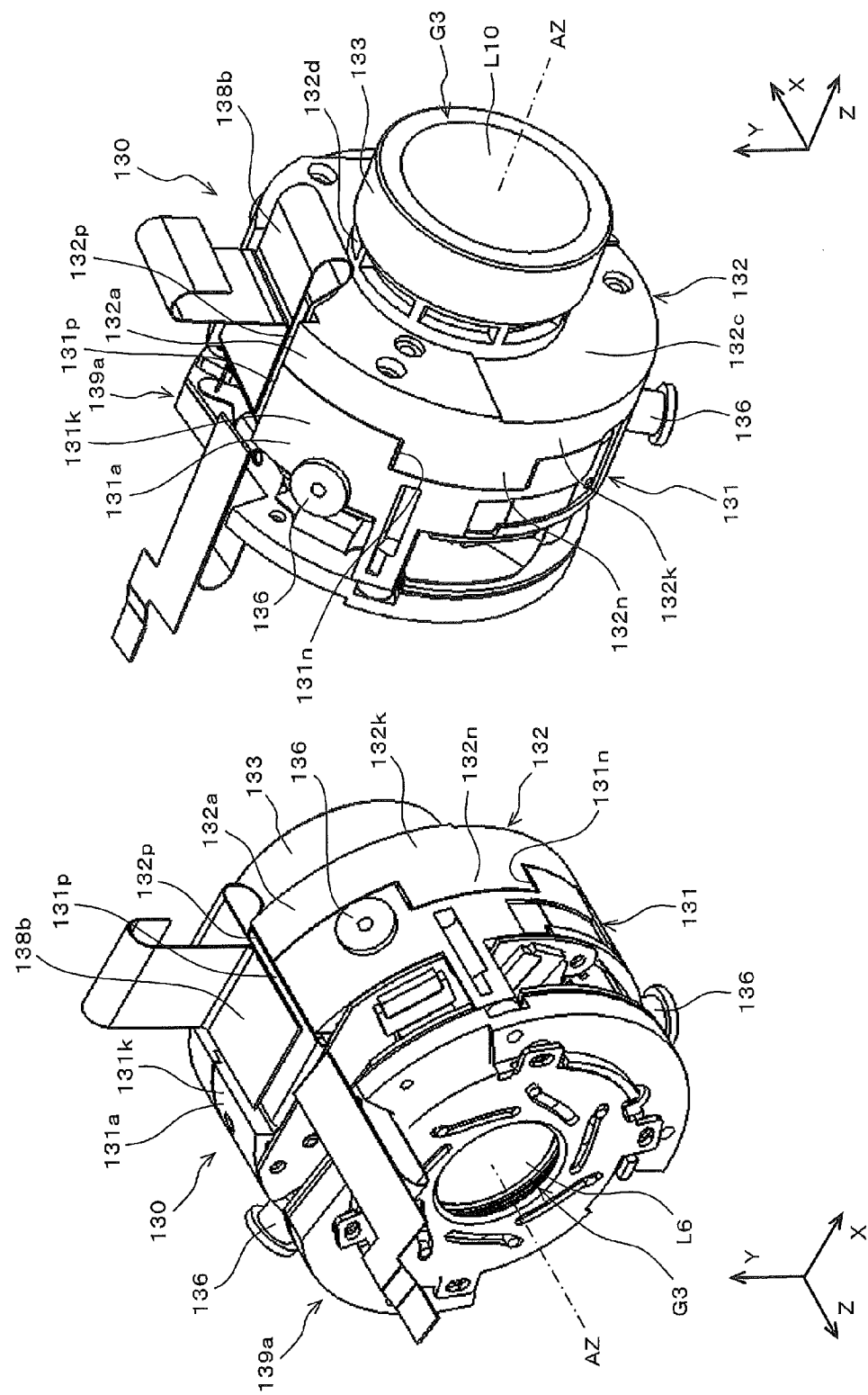
FIG. 14A is an oblique view of the front of the third lens group support unit.
FIG. 14B is an oblique view of the rear of the third lens group support unit.
Figure 15:
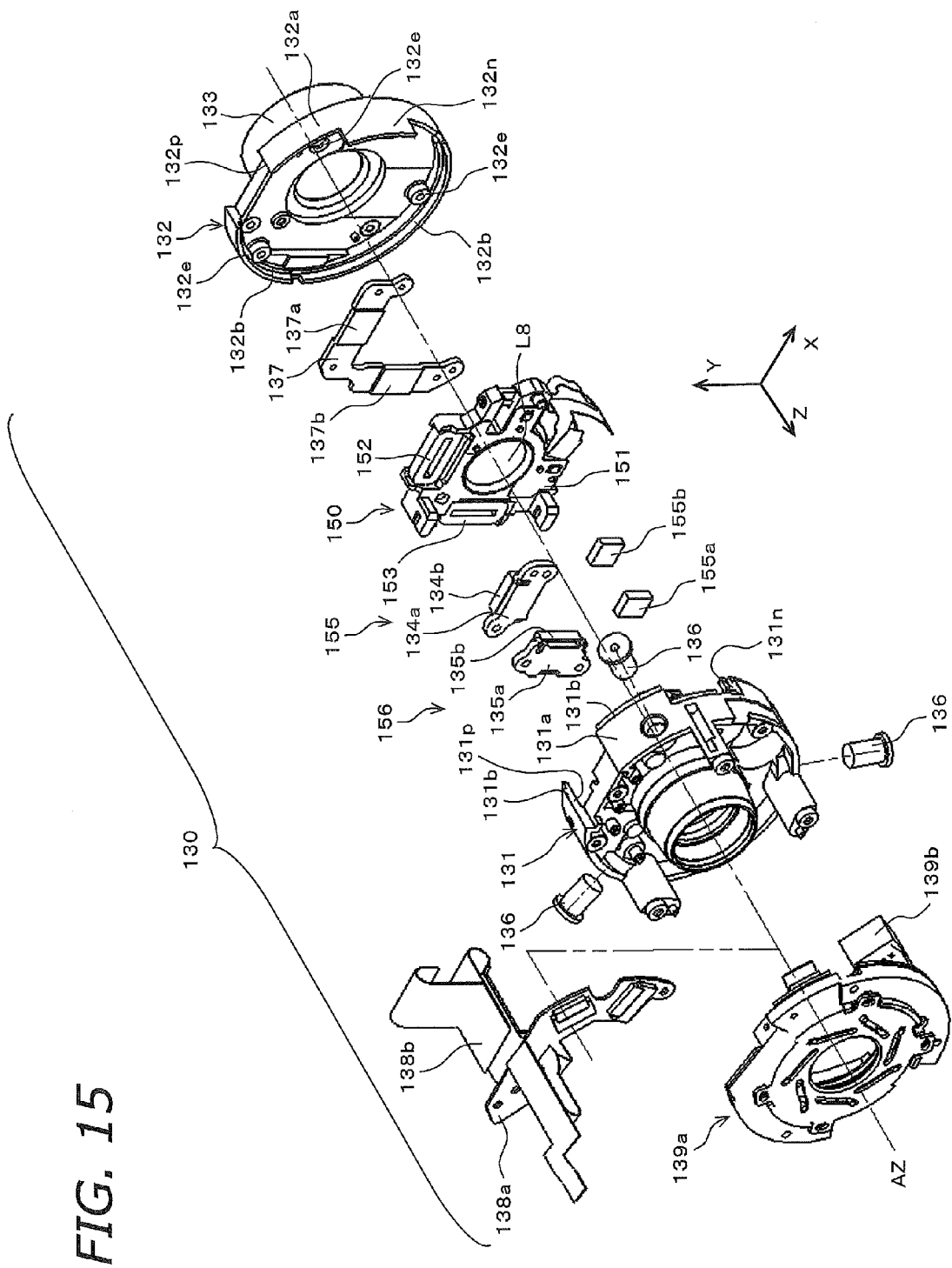
FIG. 15 is an exploded oblique view of the third lens group support unit.

(k) As best in shown in FIGS. 14A, 14B and 15, since the cut-outs 131p and 132p are formed in the front protrusion 131a and the rear protrusion 132a, the front protrusion 131a and the rear support frame 132 are not completely annular, but the front protrusion 131a and the rear support frame 132 may instead be completely annular portions. In this case, the overall strength of the third lens group support unit 130 can be increased.

Also, even if the cut-outs 131p and 132p are formed over a wider range, as long as the front protrusion 131a and the rear protrusion 132a are formed in an area that is at least half the distance in the circumferential direction, the overall strength of the third lens group support unit 130 can be increased.

Furthermore, as shown in FIGS. 15 and 16, the front contact portions 131b may be formed integrally in an annular shape. Also, the plurality of rear contact portions 132b may be formed integrally in an annular shape.

(l) As shown in FIGS. 14A and 14B, the first outer peripheral face 131k of the front support frame 131 is disposed in the same radial position as the outer peripheral face 132m of the rear contact portions 132b, but the first outer peripheral face 131k need only be disposed in substantially the same radial position. The phrase "the first outer peripheral face 131k is disposed in substantially the same radial position as the outer peripheral face 132m" here encompasses a case in which the first outer peripheral face 131k is shifted in the radial direction from the outer peripheral face 132m, to the extent that the third lens group support unit 130 does not become larger.

Additions

The lens barrel as described above in the preferred embodiment also encompasses the following features:

Addition 1

The lens barrel comprises a first optical element, a second optical element, a first support member and a second support member. The second optical element is disposed spaced apart from the first optical element in a first direction parallel to the optical axis of the first optical element. The first support member is a member that supports the first optical element and has a first main body portion to which the first optical element is fixed and a first positioning portion extending in the first direction from the outer peripheral part of the first main body portion. The second support member is a member that supports the second optical element and has a second main body portion that is disposed spaced apart from the first main body portion in the first direction and to which the second optical element is fixed and a second positioning portion that extends in the first direction from the outer peripheral part of the second optical element and that performs positioning in a second direction perpendicular to the optical axis of the second main body portion with respect to the first main body portion along with the first positioning portion.

Addition 2

The lens barrel comprises a third optical element and a third support member. The third optical element is disposed between the first optical element and the second optical element. The third support member is disposed between the first main body portion and the second main body portion, and supports the third optical element movably in the second direction with respect to the first optical element and the second optical element.

Addition 3

The first positioning portion of the lens barrel comprises a first protrusion that protrudes in the first direction from the outer peripheral part of the first main body portion, and a first contact portion that protrudes in the first direction from the first protrusion. The second positioning portion has a second protrusion that extends to the first support member side in the first direction from the outer peripheral part of the second main body portion, and a second contact portion that protrudes to the first support member side in the first direction from the second protrusion and comes into contact with the first contact portion.

Addition 4

The third support member of the lens barrel is disposed on the inner peripheral side of the first contact portion and the second contact portion.

Addition 5

The first protrusion and the second protrusion of the lens barrel are substantially annular.

The term "substantially annular" here encompasses a shape in which there is a missing portion, such as when part has been cut out.

Addition 6

The lens barrel wherein the first protrusion has a first outer peripheral face, and the second protrusion has a second outer peripheral face. The first contact portion has a first contact face disposed more to the inner peripheral side than the first outer peripheral face. The second contact portion has a second contact face that comes into contact with the first contact face in the second direction, and is disposed on the outer peripheral side of the first contact portion.

Addition 7

The first outer peripheral face of the lens barrel is disposed at the same position as the outer peripheral face of the second contact portion or more to the outside in the second direction than the outer peripheral face of the second contact portion.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having," "with" and their derivatives. Also, the term "part," "section," "portion," "member," or "element" when used in the singular can have the dual meaning of a single part or a plurality of parts.

The term "configured" as used herein to describe a component, section or part of a device implies the existence of other unclaimed or unmentioned components, sections or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lens barrel, comprising:
    a first lens element having an optical axis;
    a first support frame configured to support the first lens element;
    a second support frame including a plurality of circumferentially spaced fixing portions disposed around the optical axis of the first lens element and a plurality of cam followers coupled to the fixing portions, the first support frame being movably supported by the second support frame in a first direction parallel to the optical axis; and
    a drive unit configured to move the first support frame in the first direction, the cam followers being arranged substantially perpendicular to the optical axis of the first lens element and substantially perpendicular to the outer peripheral side of the drive unit when viewed in the first direction, portions of the drive unit being circumferentially disposed between the fixing portions when viewed in the first direction.

2. The lens barrel according to claim 1, wherein the fixing portions are concentrically disposed with the cam followers around the outer peripheral side of the drive unit.

3. The lens barrel according to claim 1, wherein the drive unit includes a coil for transmitting an electrical current and a first magnet opposite to and facing the coil.

4. The lens barrel according to claim 3, wherein the first magnet is disposed on the outer peripheral side of the drive unit in a position different from the cam followers.

5. The lens barrel according to claim 3, wherein the coil surrounds the first lens element when viewed in the first direction, and includes a polygonal shape with at least five apexes.

6. The lens barrel according to claim 3, further comprising a second lens element, wherein the second lens element and the first magnet are supported by the second support frame, and the coil is supported by the first support frame and is movable through a space on an outer peripheral side of the first lens element.

7. The lens barrel according to claim 3, wherein the drive unit further includes a second magnet opposite to and facing the coil, and the second magnet being disposed on the outer peripheral side of the drive unit at a position different from the cam followers and the first magnet.

8. The lens barrel according to claim 7, wherein the first and the second magnets are positioned along an imaginary circle that is concentric with the optical axis of the first lens element.

9. The lens barrel according to claim 8, wherein the first and the second magnets are symmetrically disposed about the longitudinal center line axis of one of the plurality of cam followers .

10. The lens barrel according to claim 9, further comprising:
    a sensor magnet fixed to the first support frame; and
    a position sensor disposed proximate to the sensor magnet and supported by the second support frame, the position sensor being operatively coupled to the sensor magnet to detect a position of the first support frame relative to the second support frame.

11. The lens barrel according to claim 10, wherein
the first and the second magnets are symmetrically disposed about the sensor magnet when viewed in the first direction.

12. The lens barrel according to claim 7, wherein
the first magnet includes a first face arranged opposite to and facing the coil, and the second magnet includes a second face arranged opposite to and facing the coil, the first and second magnets being arranged relative to the optical axis such that either an acute angle or an obtuse angle is formed between a first center line perpendicular to the first face and a second center line perpendicular to the second face.

13. The lens barrel according to claim 3, wherein
the plurality of cam followers include a first cam follower, a second cam follower, and a third cam follower spaced around the optical axis of the first lens element,
the first magnet is disposed in a first area formed between the first cam follower and the second cam follower in the circumferential direction, and
the second magnet is disposed in a second area formed between the first cam follower and the third cam follower in the circumferential direction.

14. The lens barrel according to claim 3, wherein
the plurality of cam followers includes a first cam follower, a second cam follower, and a third cam follower spaced apart around the optical axis of the first lens element.

15. The lens barrel according to claim 14, wherein
the first magnet is disposed between the first cam follower and the second cam follower, and
the second magnet is disposed between the first cam follower and the third cam follower.

16. A lens barrel, comprising:
a first lens element having an optical axis;
a first support frame configured to support the first lens element;
a second support frame including a plurality of cam followers, the first support frame being movably supported by the second support frame in a first direction parallel to the optical axis;
a coil fixed to one of the first and second support frames;
a first magnet fixed to one of the first and second support frames different from which the coil is fixed, the first magnet including a first face arranged opposite to and facing the coil; and
a second magnet fixed to one of the first and the second support frames different from which the coil is fixed, the second magnet including a second face arranged opposite to and facing the coil,
the first and the second magnets being arranged relative to the optical axis such that either an acute angle or an obtuse angle is formed between a first center line perpendicular to the first face and a second center line perpendicular to the second face.

17. An imaging device, comprising:
a lens barrel including
 a first lens element having an optical axis,
 a first support frame configured to support the first lens element,
 a second support frame having a plurality of circumferentially spaced fixing portions disposed around the optical axis of the first lens element and a plurality of cam followers coupled to the fixing portions, the first support frame being movably supported by the second support frame in a first direction parallel to the optical axis, and
 a drive unit configured to move the first support frame in the first direction, the cam followers being arranged substantially perpendicular to the optical axis of the first lens element and substantially perpendicular to the outer peripheral side of the drive unit when viewed in the first direction, portions of the drive unit being circumferentially disposed between the fixing portions when viewed in the first direction; and
an imaging element configured to convert light passing through the lens barrel into an electrical signal.

* * * * *